United States Patent
Zappella et al.

(10) Patent No.: US 12,333,438 B1
(45) Date of Patent: Jun. 17, 2025

(54) RESOURCE-EFFICIENT TECHNIQUES FOR REPEATED HYPER-PARAMETER OPTIMIZATION

(71) Applicant: Amazon Technologies, Inc., Seattle, WA (US)

(72) Inventors: Giovanni Zappella, Berlin (DE); Cedric Philippe Archambeau, Berlin (DE); David Salinas, Meylan (FR)

(73) Assignee: Amazon Technologies, Inc., Seattle, WA (US)

( * ) Notice: Subject to any disclaimer, the term of this patent is extended or adjusted under 35 U.S.C. 154(b) by 1023 days.

(21) Appl. No.: 17/364,775

(22) Filed: Jun. 30, 2021

(51) Int. Cl.
  G06N 3/082 (2023.01)
  G06F 18/214 (2023.01)
  G06F 18/23 (2023.01)
  G06N 3/045 (2023.01)

(52) U.S. Cl.
  CPC ........... *G06N 3/082* (2013.01); *G06F 18/214* (2023.01); *G06F 18/23* (2023.01); *G06N 3/045* (2023.01)

(58) Field of Classification Search
  None
  See application file for complete search history.

(56) References Cited

U.S. PATENT DOCUMENTS

2019/0258931 A1 * 8/2019 Garcia ................... G06N 3/084
2020/0226496 A1 * 7/2020 Basu ........................ G06N 5/01
2021/0357808 A1 * 11/2021 Tsuyuki .............. G06F 18/2178
2022/0051138 A1 * 2/2022 Stoll ...................... G06V 20/56
2023/0048405 A1 * 2/2023 Huang ................. G06N 3/0985

OTHER PUBLICATIONS

Yogatama et al., "Efficient Transfer Learning Method for Automatic Hyperparameter Tuning," 2014, https://proceedings.mlr.press/v33/yogatama14.pdf.*
Li et al., "Pruning SMAC search space based on key hyperparameters," Jun. 1, 2020, https://onlinelibrary.wiley.com/doi/full/10.1002/cpe.5805.*
Hutter et al., "Sequential Model-Based Optimization for General Algorithm Configuration," 2011, https://www.semanticscholar.org/paper/Sequential-Model-Based-Optimization-for-General-Hutter-.*
Perrone et al., "Learning search spaces for Bayesian optimization: Another view of hyperparameter transfer learning," Sep. 27, 2019, https://arxiv.org/abs/1909.12552.*

(Continued)

*Primary Examiner* — Ryan Barrett
(74) *Attorney, Agent, or Firm* — Robert C. Kowert; Kowert, Hood, Munyon, Rankin & Goetzel, P.C.

(57) ABSTRACT

A particular hyper-parameter combination (HPC) that was recommended for a first task is included in a collection of candidate HPCs evaluated for a second task. Hyper-parameter analysis iterations are conducted for the second task using the collection. In one of the iterations, the second task is executed using a first iteration-specific set of HPCs, including the particular HPC and one or more other members of the collection. One or more of the HPCs of the first iteration-specific set of HPCs are pruned to generate a second iteration-specific set of HPCs for a subsequent iteration. HPCs are selected for pruning based on a comparison of their results with the results obtained from the particular HPC that was recommended for the first task. A recommended HPC for the second task is identified based on results of the analysis iterations.

20 Claims, 9 Drawing Sheets

(56) References Cited

OTHER PUBLICATIONS

Rahaf, et al., "Task-Free Continual Learning," In Proceedings of the IEEE/CVF Conference on Computer Vision and Pattern Recognition (CVPR), 2019, pp. 11254-11263.

Jean-Yves Audibert, et al, "Best Arm Identification in Multi-Armed Bandits," COLT—23th Conference on Learning Theory, Haifa, Israel. 2010, pp. 1-17.

Zalan Borsos, et al., "Coresets via Bilevel Optimization for Continual Learning and Streaming," arXiv preprint arXiv:2006.03875v2, 2020, pp. 1-22.

Xuanyi Dong and Yi Yang, "Nas-bench-201: Extending the Scope of Reproducible Neural Architecture Search," (arXiv:2001.00326v2), Published at ICLR 2020 as a spotlight paper; pp. 1-16.

Stefan Falkner, et al., "BOHB: Robust and Efficient Hyperparameter Optimization at Scale," In Proceedings of the 35th International Conference on Machine Learning, PMLR vol. 80: pp. 1437-1446, 2018.

Matthias Feurer, et al., "Initializing Bayesian Hyperparameter Optimization via Meta-Learning," In AAAI'15: Proceedings of the Twenty-Ninth AAAI Conference on Artificial Intelligence, vol. 29, No. 1, Jan. 2015, pp. 1128-1135.

Kevin Jamieson and Ameet Talwalkar, "Non-stochastic Best Arm Identification and Hyperparameter Optimization," In Proceedings of the 19th International Conference on Artificial Intelligence and Statistics, PMLR 51: pp. 240-248, 2016.

Tinu Theckel Joy, et al., "A flexible transfer learning framework for Bayesian optimization with convergence guarantee," Expert Systems with Applications, vol. 115; pp. 656-672, 2019.

Zohar Karnin, et al., "Almost Optimal Exploration in Multi-Armed Bandits," In Proceedings of the 30th International Conference on Machine Learning, PMLR 28(3): pp. 1238-1246, 2013.

Aaron Klein and Frant Hutter, "Tabular Benchmarks for Joint Architecture and Hyperparameter Optimization," CoRR2019, abs/1905.04970, 2019. URL http://arxiv.org/abs/1905.04970, pp. 1-16.

Aaron Klein, et al., "Model-based Asynchronous Hyperparameter and Neural Architecture Search," (arXiv:2003.10865v2), pp. 1-17, 2020.

Lisha Li, et al., "Efficient Hyperparameter Optimization and Infinitely Many Armed Bandits," CoRR, abs/1603.06560, 2016. URL http://arxiv.org/abs/1603.06560, pp. 1-23, 2016.

Sergio Moro, et al., "A data-driven approach to predict the success of bank telemarketing," Elsevier, Decision Support Systems, vol. 62; pp. 22-31, Jun. 2014.

Fabian Pedregosa, et al., "Scikit-learn: Machine Learning in Python," Journal of Machine Learning Research, 12(85): 2011, URL http://jmlr.org/papers/v12/pedregosa11a.htm, pp. 2825-2830, 2011.

Valerio Perrone, et al., "Scalable hyperparameter transfer learning," In NIPS'18: Proceedings of the 32nd International Conference on Neural Information Processing Systems, Dec. 2018, pp. 6846-6856.

Valerio Perrone, et al., "Learning search spaces for Bayesian optimization: Another view of hyperparameter transfer learning," (arXiv:1909.12552v1), In Advances in Neural Information Processing Systems, pp. 12771-12781, 2019.

David Salinas, et al., "A Quantile-based (Copula) Approach for Hyperparameter Transfer Learning," arXiv preprint 2019 at arXiv:1909.13595, pp. 1-14, 2019.

Danny Stoll, et al., "Hyperparameter Transfer Across Developer Adjustments," arXiv:2010.13117v1, pp. 1-22, 2020.

Lazar Valkov, et al., A simple transfer-learning extension of hyperband, 32nd Conference on Neural Information Processing Systems (NIPS 2018), Montreal, Canada, pp. 1-6, 2018.

Zirui Wang, et al., "Characterizing and avoiding negative transfer," (found at arXiv:1811.09751v3), In Proceedings of the IEEE/CVF Conference on Computer Vision and Pattern Recognition, pp. 11293-11302, 2019.

Fela Winkelmolen, et al., "Practical and sample efficient zero-shot HPO," (found at arXiv:2007.13382v1), pp. 1-23, 2020.

I.-Cheng Yeh and Che-hui Lien, "The comparisons of data mining techniques for the predictive accuracy of probability of default of credit card clients," Elsevier, Science Direct, Expert Systems with Applications, vol. 36, Issue 2, Part 1, pp. 2473-2480, 2009.

* cited by examiner

RESOURCE-EFFICIENT TECHNIQUES FOR REPEATED HYPER-PARAMETER OPTIMIZATION

BACKGROUND

Many types of non-trivial activities, such as training machine learning models or tuning a web services application in a multi-tier execution environment, can be modeled as pipelines of individual tasks, which often have to be performed in multiple iterations before the activity can be successfully concluded. In some cases, a number of high-level decisions, such as the particular type of machine learning model to be used in the case of the machine learning training, may have to be made prior to at least some iterations of the activity. Such decisions may be considered the equivalent of selecting values for hyper-parameters of the activities: for example, for training a machine learning model, details of the architecture of the models (e.g., the number of layers of various types of a neural network) may be considered one set of hyper-parameters, the feature transformations to be applied to raw input may be considered another set of hyper-parameters, and so on. For some activities, the number of combinations of values that can be assigned to the hyper-parameters as a group may be quite large (e.g., in the range of thousands or millions).

The hyper-parameter values selected for a task may in many cases significantly impact the quality of the technical results achieved, as well as the total cost of resources consumed to achieve the results. For example, for some kinds of machine learning problems, an inappropriate learning rate may lead to a lack of convergence of an algorithm, and a poor choice of a regularization setting may result in a model that fails to generalize well to cases that differ from the examples used for training. In the case of the tuning of an application, a poor choice for a maximum memory heap size setting may result in poor performance (if the heap size chosen is too small) or wastage of memory (if the heap size is chosen too large). Determining the impact of specific hyper-parameter value combinations may be hard—e.g., it may take several hours or even days of computation to complete one model training iteration or to measure the performance of one iteration of a complex test workload.

Figure 1:
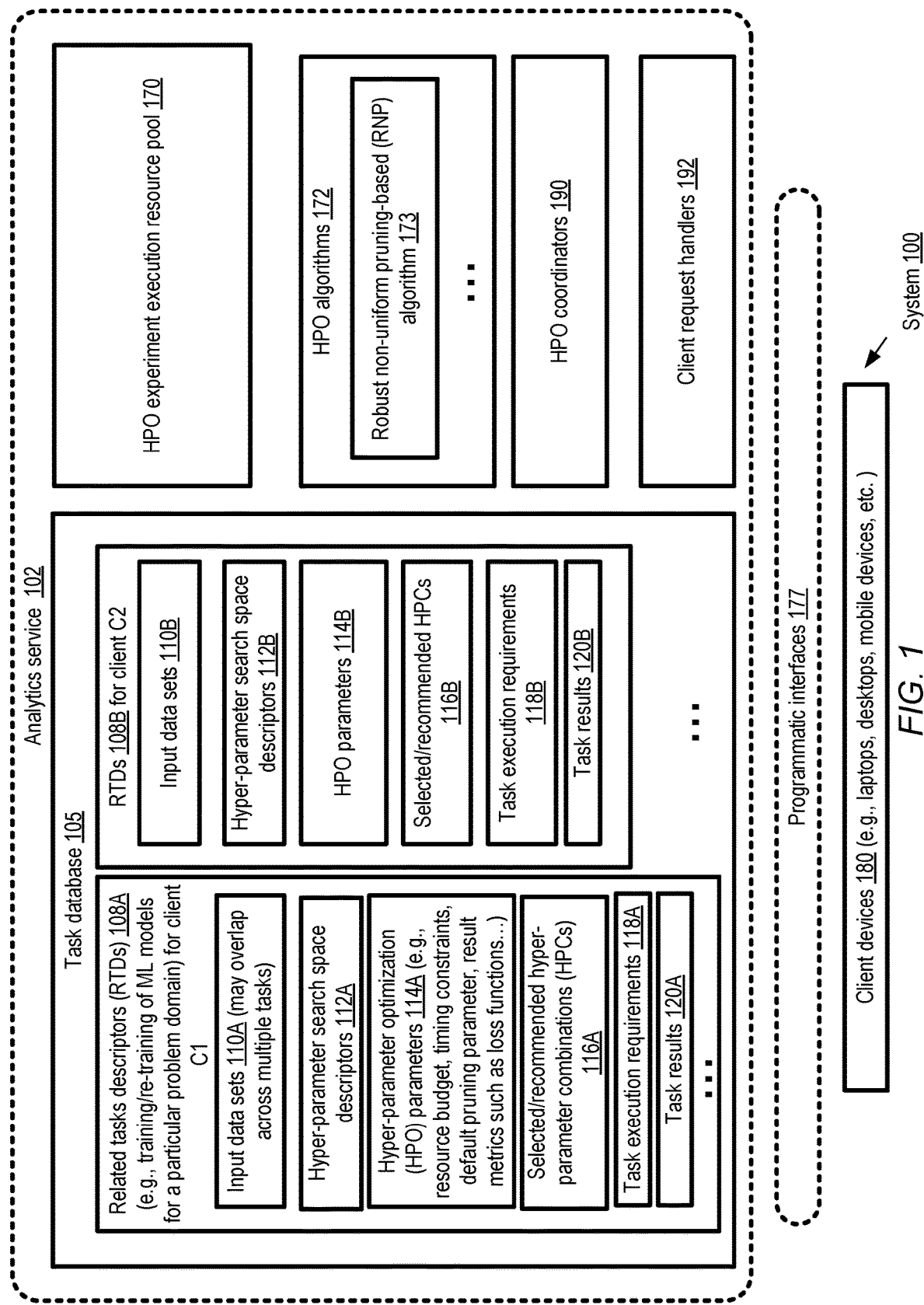
FIG. 1 illustrates an example system environment in which a robust non-uniform pruning-based algorithm for resource-efficient hyper-parameter optimization may be employed at an analytics service, according to according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for efficiently identifying hyper-parameter combinations for tasks such as training complex machine learning models, based on utilizing results of hyper-parameter selection results of other related tasks. Often, in production systems, the same type of machine learning problems have to be addressed repeatedly over time, usually within a fixed amount of time and using a limited set of resources for each problem repetition. For example, new versions of machine learning models designed to generate recommendations for content to be presented to a large and diverse set of end-users of a web site (such as a large store's web site) may have to be re-trained periodically (e.g., once every week or once every day) based on new data sets indicating recent trends in end-user interactions with the web site. Each time a new set of models has to be trained, values of numerous hyper-parameters may have to be selected fairly quickly. In the proposed approach, lessons learned from earlier tasks of a series of related tasks are used to make the selection of hyper-parameters more efficient for later tasks of the series, by more aggressively reducing or pruning the set of HPCS that need to be tested than if the information about the earlier tasks were not considered.

The problem of selecting hyper-parameter combinations (HPCs) is also referred to as hyper-parameter optimization (HPO). In scenarios in which hyper-parameters have to be selected for respective tasks of a series of tasks which share properties with each other (such as overlapping search spaces for their hyper-parameters), the problem can be referred to as "repeated" HPO, since there is some level of commonality between the tasks. At least for some types of use cases, repeated HPO can be framed as a sequence of best arm identification (BAI) experiments, where the terminology "arm" refers to respective choices of hyper-parameter combinations, and is taken from the technical literature on the so-called "multi-armed bandit" problem. At a high level, in a multi-armed bandit problem, a fixed and limited set of resources has to be allocated between alternative choices in a way that maximizes the expected benefit obtaining from implementing the choices. BAI differs from the classical multi-armed bandit problem in that instead of trying to maximize the cumulative benefit or gain, the goal is simply to identify the single choice (the single arm) which has the highest benefit or gain given the limited resource available.

According to some embodiments, a record of the HPCs which were selected or recommended for earlier tasks of a series of tasks with overlapping hyper-parameter search spaces is maintained. In some cases, in addition to overlapping search spaces, the tasks of the series may satisfy one or more other similarity criteria with respect to one another, such as common or overlapping input data sets, common machine learning algorithms or model types, and so on. When an HPC has to be selected using a specified resource budget for a new task of the series, the members of that set of earlier-recommended HPCs (which can be referred to as saved HPCs or SHPCs) is also included among an initial collection of candidate HPCs evaluated for the new task. This inclusion is based on real-world experience with HPO, which suggests that if a combination of hyper-parameters was found to work well on a similar task earlier, it is likely to also perform fairly well for a new task with similar characteristics, even though the new task may also differ in several ways from the older task. The recommended HPC for the new task is found using iterative experimentation in various embodiments, with the number of iterations being determined based at least partly on the total number of candidate HPCs identified. A resource budget ascertained for the new task is split (e.g., in equal parts, or in some other deterministic manner), which each split subset of the budget being used for one of the iterations.

After experiments or trials are run using the candidate HPCs chosen for a given iteration of the analysis in some embodiments, the candidate HPCs are ranked relative to one another based on their results (e.g., gains/benefits, which may be expressed or computed in various ways depending on the type of task) obtained in that iteration. Then, the set of candidate HPCs used for a given iteration of experiments is pruned to derive the set of candidate HPCs to be used for the next iteration. The rejected or pruned HPCs are chosen for pruning in some embodiments based at least in part on comparing their ranking relative to the ranking of the saved HPCs (the SHPCs which were recommended in earlier related tasks). For example, assume that there are 10 candidate HPCs being considered in a given iteration, of which there is only one saved HPC SHPC-a, and that (in order from best to worst results), SHPC-a was $4^{th}$ out of the 10 candidates. In one implementation, given that $4^{th}$ position for SHPC-a, only the first three other candidates among the 10 would be retained as candidates for the next iteration (along with SHPC-a itself), in effect pruning 6 out of 9 of the non-SHPC candidates. This type of aggressive pruning means that HPCs that are unlikely to improve upon results already achieved are discarded without wasting further resources on them; in some cases, as a result of the pruning, the subset of the budget that was set aside for the next iteration may not even have to be fully used. By focusing resources on the subset of candidate HPCs that perform at least as well as the SHPCs, the probability of identifying an optimal (or near-optimal) HPC for the task more quickly increases. In addition to using the SHPCs' performance as a criterion for pruning, other criteria may also be used in some embodiments—e.g., a parameter that results in pruning of no less than one half (or no less than some other fraction, which may be an iteration-dependent fraction) of the candidate HPCs from one iteration to the next may be used.

The algorithm introduced above may be referred to as a robust non-uniform pruning-based (RNP) algorithm for HPC selection in at least some embodiments, as the extent of pruning performed may differ from one iteration for a task to another iteration (hence the term "non-uniform"), and because the algorithm is robust to negative information transfer from one task to another (i.e., the algorithm has been shown to perform well even if the information passed from earlier tasks is misleading or not useful). Note that the techniques introduced herein may be applied to tasks that are not necessarily related to machine learning in at least some embodiments, such as tasks involving selecting settings for tunable parameters at various layers of a software and hardware stack used for successive versions of a multi-tier application.

As one skilled in the art will appreciate in light of this disclosure, certain embodiments may be capable of achieving various advantages, including some or all of the following: (a) substantially reducing the total amount of computational, memory, storage and/or networking resources required to identify optimal or near-optimal combinations of hyper-parameters for complex tasks and/or (b) enhancing the overall quality of the inferences produced large-scale deep neural network-based models and other sophisticated models, for which exhaustive searched of hyper-parameter spaces may be impracticable. The proposed techniques have been found to be extremely effective even in scenarios in which the number of earlier related tasks for which HPCs have been identified is quite small, and in scenarios in which the methodologies or algorithms used for performing the related tasks changes in non-trivial ways over time.

According to some embodiments, a system may comprise one or more computing devices. The computing devices may include instructions that upon execution on or across the computing devices cause the computing devices to obtain an indication that respective sets of HPC analysis experiments are to be conducted for a plurality of related tasks (such as machine learning tasks) using the RNP algorithm. The tasks may be said to be related to each other in that the hyper-parameter search spaces (i.e., all possible combinations of multiple hyper-parameters of each task) of individual ones of the tasks overlap at least partly with those of at least one other task. Using a first set of HPC analysis experiments, a first recommended HPC (RHPC-A) for a first task of the related tasks may be identified in various embodiments. RHPC-A may be stored in a database of saved previously-recommended HPCs (SHPCs) maintained for the set of related tasks in some embodiments.

The first recommended HPC RHPC-A may then be included in a collection of candidate HPCs to be analyzed for a second task of the plurality of related tasks in various embodiments. The other members of the candidate HPC collection may, for example, be selected using randomized selection techniques from the hyper-parameter search space of the second task, or using a deterministic selection technique. In some cases, a client on whose behalf the HPC analysis is conducted may provide an indication of the algorithm to be used to select at least some members of the candidate HPC collection from the search space.

Using the collection of candidate HPCs, a second set of HPC analysis experiments may be conducted for the second task. The second set of experiments may comprises a plurality of analysis iterations. A given iteration may include performing the second task using a first iteration-specific set of HPCs, HPCs-iter_i (where the notation "iter_i" stands for "$i^{th}$ iteration"). HPCs-iter_i may include (a) RHPC-A and (b) one or more other members of the collection of candidates. Respective rankings may be assigned in various embodiments to individual members of HPCs-iter_i based at least in part on respective result metrics (e.g., loss function values in the case of certain types of machine learning training tasks) obtained by performing the second task with each of the HPCs.

One or more HPCs from HPCs-iter_i may be classified or designated as suitable-for-future-iterations in various embodiments, based at least in part on a comparison of (a) respective rankings assigned to those one or more HPCs and (b) a ranking assigned to RHPC-A. In effect, at least some HPCs may be designated as suitable or preferred for future iterations if they perform as well as or better than RHPC-A did in the current iteration. HPCs which do not meet this criterion and are thus implicitly classified as unsuitable for future iterations may be pruned or rejected as candidates for subsequent iterations, thereby potentially saving resources which might otherwise have been spent on trying HPCs that are not likely to perform well. Starting with HPCs-iter_i, a second iteration-specific set of HPCs for a subsequent analysis iteration (e.g., (e.g., HPCs-iter_i+1 for the $(i+1)^{th}$ iteration) of the plurality of analysis iterations may be generated, e.g., by pruning one or more HPCs (which are not classified as preferred for future iterations) from HPCs-iter_i in at least some embodiments. The next iteration may then be conducted using this pruned set of HPCs.

The results (e.g., loss function values) achieved from each of the tested HPCs in each of the iterations may be retained, and a recommended HPC for the second task may be selected based on those results (e.g., the particular HPC which performed the best among all the tested HPCs may be selected as the recommended HPC). In various embodiments, an indication of the first recommended HPC and/or the corresponding results achieved for the first task using the recommended HPC may be stored.

In at least some embodiments, in addition to using the ranking of the earlier-recommended HPCs to reject some HPCs from the set of HPCs considered for the next iteration, one or more other pruning control parameters may also be used to reject HPCs for the next iteration. For example, a default pruning parameter, which is independent of the results achieved from any of the previously-recommended HPCs such as RHPC-A, may be selected such that in any given iteration, at least half the candidate HPCs considered for that iteration are rejected from consideration in the next iteration, regardless of the ranking of the previously-recommended HPCs. Such a use of a default pruning parameter may represent one example of a default pruning strategy; other types of default pruning strategies used in some embodiments may utilize other factors or parameters. In effect, the HPCs tried out in a given iteration may be grouped into a plurality of ordered ranking-based sub-groups, and only members of some of the ranking-based sub-groups with the higher ranks may be considered for inclusion in candidate HPCs to be tried in the next iteration. If the default pruning rate parameter is set to 2, for example, the sub-group containing the top half of the candidates when ranked by performance or loss may be considered for inclusion in the transition from iteration 1 to iteration 2, the sub-group containing the top $¼^{th}$ of the candidates may be considered for inclusion in the transition from iteration 2 to iteration 3, etc. Note that both the default pruning rate parameter and the ranking of previously-recommended HPCs may be used together for pruning in at least some embodiments, so that the number of HPCs pruned between iterations may be determined based on the more aggressive of the two factors: if using the default parameter alone would lead to pruning K HPCs, and using the ranking of the previously-recommended HPCs would lead to pruning L HPCs, the number of HPCs pruned would be selected as the maximum of K and L. The default pruning parameter or pruning strategy may be changed from one task to another, or even from one iteration to another in some implementations.

In at least some embodiments, the RNP algorithm may be implemented at a network-accessible service, such as an analytics service or an optimization service, of a provider network or cloud computing environment. Such a service may implement a set of programmatic interfaces, such as web-based consoles, command-line tools, graphical user interfaces, and/or application programming interfaces (APIs) which can be used by its clients to submit various types of requests or messages pertaining to HPO. In at least some embodiments, information about the series of related tasks, the hyper-parameter search spaces to be considered, a default pruning parameter, parameters to be used to restrict the number of previously-recommended HPCs to be considered for a new task, and/or the resource budgets to be used for selecting or tuning hyper-parameters for one or more tasks of the series may be provided by clients to the service via such interfaces. The total number of HPC analysis iterations for a given task, and/or the number of times a given HPC is tried out in a given iteration, may be determined at least in part by the resource budgets in some embodiments. In the case of machine learning model training tasks, in various embodiments a resource budget may be expressed in terms of a number of epochs or passed through an available training data set, in terms of wall-clock time, or in terms of physical resources such as CPU-seconds or GPU-seconds. Clients may submit programmatic requests to tune or select HPCs for a given task via the programmatic interfaces in at least some embodiments. Metrics collected during the HPC selection iterations for one or more tasks (such as the total number of HPCs analyzed and rejected in various iterations, the total amount of resources consumed, and so on) may be provided via the programmatic interfaces to clients in some embodiments. In at least some embodiments, several of the candidate HPCs may be tried out in parallel within a given iteration, e.g., using a cluster of computing devices of the provider network. In some embodiments, the metrics to be used for ranking the results obtained from the different HPCs may be specified by a client—e.g., a client may provide a definition of a loss function to be used as a result quality metric.

In at least some embodiments, the number of previously-recommended HPCs that could potentially have to be considered for new task may increase substantially over time, which can lead to high resource requirements. In some such embodiments, one or more previously-recommended HPCs may be eliminated from the collection of previously-recommended HPCs to be included among the HPCs evaluated for a new task using a variety of techniques. For example, such techniques may include using: (a) a random subsampling algorithm (b) a fixed-size first-in-first-out (FIFO) queue (in which new recommended HPCs are inserted as they are identified for various tasks, and the maximum number of previously-recommended HPCs considered for a new task is no greater than the size of the queue) or (c) a clustering algorithm (in which several previously-recommended HPCs may be combined into a single HPC based on similarity analysis.

HPCs for a wide variety of tasks may be selected using the RNP algorithm and or variants thereof in different embodiments, such as training machine learning models, running performance tests on a multi-tier application, and so on. In some cases, individual tasks of a series of related tasks for which the RNP algorithm is employed may differ from one another in various ways—e.g., the result metrics may differ from one task to another, the data sets used as input for the tasks may changes, and so on. In some cases, optimal or recommended HPCs may be identified for one or more tasks of the series without using the RNP algorithm, and recommended HPCs may nevertheless be identified for other tasks of the series using RNP (that is, the recommended HPCs identified without using RNP may still be used for pruning candidate HPCs for those tasks for which RNP is used). In various embodiments in which the tasks pertain to machine learning, a given hyper-parameter of an HPC may specify or indicate one or more of: (a) a number of layers of a particular type within a neural network, (b) a number of nodes within a particular layer of a neural network, (c) a regularization parameter, (d) an indication of a transformation technique to be applied to an input data set to generate features for training a machine learning model, (e) an indication of an algorithm to be used to select input records for training a machine learning model, (f) a learning rate, and/or (g) a machine learning algorithm to be used for a task.

In at least some embodiments, as indicated above, hyper-parameter optimization techniques of the kind described above may be implemented at an analytics service of a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or services, which may include a virtualized compute service (VCS), analytics services, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as control planes for analytics services) may share the virtualized servers with the data plane, and control plane traffic and data plane traffic may be sent over separate/distinct networks.

Example Pseudo-Code

Pseud-code corresponding to one implementation of the RNP algorithm for hyper-parameter combination selection for a series of tasks is shown below. The (overlapping) hyper-parameter search space is assumed to be known for a given task at the time that the task becomes available for HPC selection. In addition, a method for computing a loss function (with a lower loss representing a better performance or a better result) is assumed to be known for each of the tasks. As shown in line 1, input parameters to the RNP algorithm may include a default pruning parameter η and a task-level budget B. In the simplified pseudo-code shown below, B is shown as a constant which does not vary from task to task; in practice, in at least some embodiments, B may differ from one task of a series of related tasks to another. In some embodiments, the default pruning parameter η may vary from one task to another, or even from one HPC analysis iteration to another for a single task.

------Start pseudo-code for RNP algorithm--------------------
1: Inputs: η (default pruning parameter), B (task-level budget)
2: $A_0^*$=null // set of SHPCs initialized to null for task index 0
3: s=0 // s is the task index, set to zero initially
4: while a new task is available do
5: $A_s^{new}$=set of new HPCs (arms) to be tested for task
6: $A_s^1 = A_s^{new} \cup A_s^*$ // include SHPCs among CHPCs (candidate HPCs) for task
7: $n=|A_s^1|$ // cardinality of CHPCs
8: for k=1, ..., $\lceil \log_\eta n \rceil$ do
9: $\forall a \in A_s^k$ try a ($\lfloor B/(\max(1, \lfloor n/\eta^k \rfloor) \lceil \log_\eta n \rceil) \rfloor$) times
10: $\forall a$, $r_a$=position of a in ranking by loss
11: $r^* = \min(r(i))$ $\forall i \in A_s^*$ // identify the SHPC with the lowest loss
12: $A_s^{k+1} = \{i \in A_s^k : r_a < \max(\min(r^*+1), \lfloor n/\eta^k \rfloor), 1)\}$
13: end for
14: â=best performing HPC identified in the for loop above
15: if â is not in $A_s^*$ then
16: $A_{s+1}^* = A_s^* \cup \{â\}$ // add best-performing HPC to SHPCs for next task
17: end if
18: s=s+1// increment task index
19: end while
------End pseudo-code for RNP algorithm--------------------

In line 2 of the pseudo-code, the set of saved previously-recommended SHPCs (which can change as more tasks of the series are conducted) is initialized to null. A task index s is set to 0 before the first task of the series, and is incremented (line 18) after the HPC selection is completed for each task of the series. Thus, for example, if HPCs are selected for 6 related tasks of a series of tasks over time, s will take on the values (0, 1, 2, 3, 4, 5).

For each new task for which HPCs are to be selected or recommended, operations corresponding to the while loop from line 4 to line 19 may be performed in various embodiments. In line 5, a set of new HPCs (each referred to as a respective arm using the multi-armed bandit or best arm identification terminology) is identified for the task. In some cases, the members of $A_s^{new}$ may be selected at random from within the hyper-parameter search space of the task; in other embodiments, a client on whose behalf the algorithm is being executed may specify at least some members of $A_s^{new}$, or a deterministic selection algorithm (which may be indicated by the client) may be used. The number of new HPCs included in $A_s^{new}$ may vary for different tasks (different values of s), and may depend for example on the budget B, the types of hyper-parameters being considered, and so on.

In line 6, the set of candidate HPCs (CHPCs) to be evaluated for the current task is constructed by adding, to the new HPCs identified in line 5, the set of saved HPCs $A_s^*$ which were recommended for previous tasks. This is the step in which, in effect, information is transferred from earlier tasks to the present task, under the assumption that if some combination of hyper-parameters worked well for a related task in the past, that combination is likely to work reasonably well for the current task. The variable n is set to the total number of HPCs in $A_s^1$ in line 7.

A number of hyper-parameter analysis iterations, each corresponding to a respective value of the loop index k of the for loop of lines 8-13 are conducted. The total number of iterations ($\lceil \log_\eta n \rceil - 1$) is based on n and the default pruning parameter. In a given iteration with for loop index k, a given HPC of the CHPCs selected for the iteration is tried out, with the number of trials based on B, n, η, and k, such that the budget B is evenly distributed among the iterations (line 9). Note that in some implementations, the total resource budget B may be distributed in a non-uniform manner among the iterations.

All the candidate HPCs that are tried in the current iteration may then be ranked relative to one another, with $r_a$ indicating the position in the ranking of an HPC a (line 10). In line 10, the ranking position of the best performer (the one with the lowest loss) among the SHPCs which were tried out is determined, and r* is set to this ranking of this best performer.

The set of candidate HPCs $A_s^{k+1}$ to be considered in the next iteration (the $(k+1)^{th}$ iteration) for the current task is determined by pruning or rejecting at least some members of the set of HPCs which were tried out in the current iteration. This is done in operations corresponding to line 12. Line 12 can be interpreted as follows: in order to be included in the set of candidate HPCs for iteration (k+1), a given HPC must have performed better than (or as well as) the best performer among the SHPCs in iteration k. Because of the presence of (r*+1), the best performer among the SHPCs is also included in the set of candidate HPCs for iteration (k+1); in iteration (k+1), the performance of this SHPC member may again be used to prune HPCs for iteration (k+2), and so on. Also, in order to be included in the set of candidate HPCs for iteration (k+1), the rank of given HPC must be better than $\lfloor n/\eta^k \rfloor$ according to line 12. Thus, for example, if the default pruning parameter n is 2 and k=1, the given HPC must have performed in the top half of the HPCs in iteration k to be retained for the $(k+1)^{th}$ iteration. The $\lfloor n/\eta^k \rfloor$ term represents a default ranking boundary or default parameter that is used for pruning HPCs in scenarios in which the SHPCs do not perform well. Note that in some embodiments, instead of only using the single best performer among the SHPCs (identified in line 11) to prune candidate HPCs for the next iteration, several of the top-performing performing SHPCs may be used. For example, instead of rejecting HPCs that do not perform as well as the top-performing SHPC, only those HPCs that do not perform as well as the $2^{nd}$-best performing SHPC or the $3^{rd}$-best performing SHPC may be rejected. Similarly, instead of retaining only the top-performing SHPC for the next iteration, the top q (where q could be 2 or 3, for example) performers may be retained for the next iteration in some embodiments.

The best performing (e.g., lowest-loss) HPC tested in the for loop, â, is identified in line 14, and added to the SHPCs for a subsequent task in lines 15-17. As a result, when HPCs are selected for the next task of the series, the HPC identified as the best performer in the current task will also be considered a candidate (because of the construction of the CHPCs set in operations corresponding to line 6 for the next task). The task index s is incremented in line 18.

Example System Environment

FIG. 1 illustrates an example system environment in which a robust non-uniform pruning-based algorithm for resource-efficient hyper-parameter optimization may be employed at an analytics service, according to according to at least some embodiments. As shown, system 100 includes resources and artifacts of an analytics service 102, including a task database 105, a hyper-parameter optimization (HPO) experiment execution resource pool 170, one or more HPO coordinators 190, one or more request handlers 192, and one or more HPO algorithms such as the robust non-uniform pruning-based (RNP) algorithm 173.

The analytics service 102 may implement a set of programmatic interfaces 177, such as web-based consoles, command-line tools, graphical user interfaces, APIs and the like in the depicted embodiment. The interfaces 177 may be utilized by clients of the analytics service to submit various types of messages or requests pertaining to the selection or optimization of hyper-parameters for various types of tasks and to receive responses from the analytics service. The requests or messages may be submitted from a variety of client devices 180, such as desktops, laptops, mobile devices and the like in different embodiments. Client requests or messages may be processed initially by client request handlers, which may then pass on internal representations of the requests/messages to other components of the analytics service, such as HPO coordinators 190. Each of the subcomponents of analytics service 102 may be implemented using some combination of software and hardware of one or more computing devices in various embodiments.

A client of the analytics service 102 may provide information about a series of related tasks to be executed on behalf of the client, for each of which recommended hyper-parameter combinations (HPCs) are to be identified by the analytics service using respective sets of experiments given a resource budget in the depicted embodiment. Entries in a task database 105 may be populated based on the information provided by the clients, and based on the HPC analysis experiments conducted by the analytics service for the client. Task database 105 may include various related task descriptors (RTDs) 108, such as RTDs 108A and 108B, with each set of RTDs representing a given set of related tasks with at least partially overlapping hyper-parameter search spaces in the depicted embodiment. For example, RTDs 108A may include information about a set of tasks involving training and/or retraining one or more machine learning (ML) models for a particular problem domain such as object recognition, text content extraction, demand forecasting for a store web site or the like on behalf of one client C1 of the analytics service. Similarly, RTDs 108B may include information about another set of related tasks for which HPCs have to be recommended for another client C2, and so on. Over time, as more tasks of a given series of related tasks is conducted, more information may be accumulated in the RTDs for that series of tasks, and at least some of the information in the RTDs may be used to reduce the amount of resources consumed for selecting HPCs for newer tasks of the same series in various embodiments.

Information stored in the RTDs 108 may include, for example, an indication of the respective input data sets 110A or 110B used for individual tasks of the series in some embodiments. The input data set may overlap from one task of a series to another in some cases; in other cases, there may not be any overlap. Respective descriptors 112 (e.g., 112A or 112B) of the hyper-parameter search spaces to be considered for various tasks of a given series may be stored as part of the RTDs in some embodiments. The search space descriptors may indicate, for example, the ranges of different hyper-parameters from which recommended combinations are to be identified. Examples of the hyper-parameters whose ranges or possible values are indicated in the hyper-parameter search space descriptors 112 for a task pertaining to machine learning may include, among others, (a) a number of layers of a particular type within a neural network, (b) a number of nodes within a particular layer of a neural network, (c) a regularization parameter, (d) an indication of a transformation technique to be applied to an input data set 110 to generate features for training a machine learning model, (e) an indication of an algorithm to be used to select input records from an input data set 110 for training a machine learning model, (f) a learning rate, (g) a type of machine learning algorithm, and so on. Note that while the search spaces of at least some hyper-parameters for different tasks may overlap, the search spaces for a given hyper-parameter may not necessarily be identical from one task to another in some embodiments. For example, for one task of the series of tasks, the range from which a regularization parameter is selected may be 0.0 to 1.0, while for another task of the series, the range from which the regularization parameter is selected may be 0.25 to 1.15.

A set of respective hyper-parameter optimization parameters 114 (e.g., 114A or 114B) for each of the tasks of a series may be included in the RTDs in some embodiments. Such parameters may include, for example, resource budgets for each of the tasks, timing constraints indicating how quickly the recommended HPC has to be identified, default pruning parameters of the RNP algorithm 173 or similar parameters of alternative HPO algorithms 172, the loss functions or other result metrics to be used to rank the HPCs, and so on. In some embodiments, the HPO parameters for a given task of a series of related task may differ from the HPO parameters for other tasks of the same series. In other embodiments, the same HPO parameters may be used for several or all of the tasks of a given series. The selected or recommended HPCs 116 (e.g., 116A or 116B) identified by the HPO coordinators using HPO algorithms 172 may be stored as part of the RTDs 108 in some embodiments. As HPC analysis experiments for more tasks of a given series are conducted using the RNP algorithm 173 in various embodiments, the previously-recommended HPCs may be used to prune the set of combinations to be tried, as discussed earlier and indicated in the RNP pseudo-code discussed above. In some embodiments, the RTDs 108 may include respective task execution requirements 118 (e.g., 118A or 118B), such as whether the tasks require GPUs (graphics processing units) with particular processing capabilities, whether a particular version of an operating system is needed for a given task of a series, etc. Task results 120A and/or 120B, obtained using at least the selected/recommended HPCs, may be stored as part of the RTDs in the depicted embodiments. Clients may specify various parts of the information stored in the RTDs in some embodiments, such as the input data sets, the search space descriptors, one or more of the HPO parameters, and/or task execution requirements. In other embodiments, at least a portion of the hyper-parameter search space and/or at least a subset of the HPO parameters may be selected automatically by the HPO coordinators, without requiring client input. For example, some candidate hyper-parameter ranges (such as the kinds of transformations that can be applied to the input records) may be identified automatically based on the type of input data included in the input data set, settings for HPO parameters may be determined automatically based on defaults used for other related task series in the past, and so on. RTDs 108 of task database 105 may also include the code (e.g., executable code or source code) to be run to implement the various tasks using various HPCs in at least some embodiments.

The HPO coordinators 190 may be responsible for orchestrating the HPC analysis experiments for various tasks as the tasks become available, e.g., using the RNP algorithm 173. Iterative experiments of the kind introduced above and discussed in the context of the RNP pseudo-code may be conducted by the HPO coordinators using HPO experiment execution resource pool 170 in various embodiments. The resources included in the resource pool may comprise, among others, compute instances of a virtualized computing service, physical (non-virtualized) machines, clusters of servers optimized for parallel computing, and so on. In some embodiments, clients of the analytics service may indicate their own resources (e.g., including resources at client-managed or client-owned premises) which can be used for the HPC analysis experiments.

As part of the iterations of HPC analysis for a given task, the HPO coordinators 190 may identify the set of candidate HPCs to be considered (which may include at least some of the previously-selected or previously-recommended HPCs 116 for related tasks) in a given iteration in various embodiments. The HPO coordinators may then try out the candidate HPCs, rank all the tried HPCs of a given iteration relative to one another based on the result metrics of the task, and then prune at least some of the HPCs tried in the current iteration to generate the set of HPCs to be considered as candidates for the next iteration as described above. After all the HPC analysis iterations have been conducted for a given task, the best-performing HPC may be added to the selected/recommended HPCs entry 116 for the set of related tasks, and the result achieved using that best-performing HPC may be added to the RTDs for the set of related tasks in at least some embodiments.

Examples of Series of Related Tasks

Figure 2:
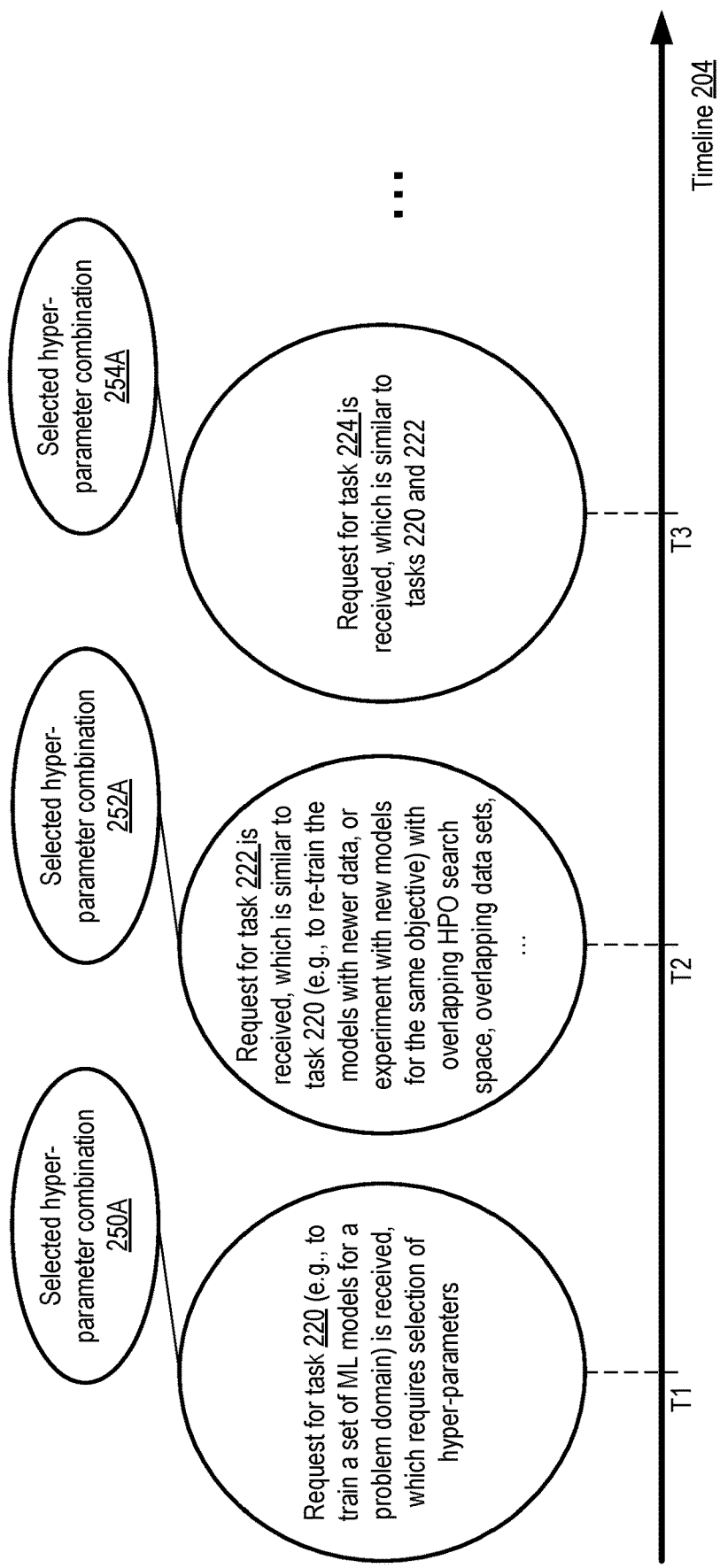
FIG. 2 illustrates an example timeline in which hyper-parameter optimization for numerous related tasks may have to be performed, according to at least some embodiments.

FIG. 2 illustrates an example timeline in which hyper-parameter optimization for numerous related tasks may have to be performed, according to at least some embodiments. As shown, requests for three tasks may be received, e.g., at an analytics service 102 similar to analytics service 102 of FIG. 1 at respective points in time along timeline 204. At time T1, a request for task 220 may be received, which requires selection of hyper-parameters. The task may comprise, for example, training a set of machine learning models for a problem domain. A set of HPC analysis experiments may be conducted, and a hyper-parameter combination 250A may be selected for the first of the three tasks.

At time T2, a request for a second task 222, which is similar to the first task in one or more characteristics, may be received in the depicted embodiment. In particular the second task may have an overlapping hyper-parameter search space with respect to the first task—that is, at least some of the ranges or choices of hyper-parameter values that can be selected for the second task could also have been selected for the first task. The second task could, for example, involve re-training the models trained in the first task, this time using newer data than was used for the first task. Alternatively, a different set of machine learning models or algorithms may be tried in the second task than were tried in the first task for the same overall objective or problem domain (e.g., accurately identifying objects within images). A second hyper-parameter combination 252A may be identified for the second task.

At time T3 along timeline 204, a request for a third task 224 may be received, with the third task being similar and sharing at least a portion of its hyper-parameter search space with the earlier two tasks. Eventually, after some experimentation, a third hyper-parameter combination 254A may be recommended and used for the third task. The observation shown at the top of FIG. 2 underlies the motivation for the RNP algorithm: when searching for recommended hyper-parameter combinations for a newer task, we may be able to benefit from what was learned during searched for hyper-parameters for similar older tasks, as long as we take changed experimental conditions into account. Note that depending on how different the experimental conditions are among the different tasks, it may not always be fruitful to simply re-use the same hyper-parameter combinations that were identified earlier. The RNP algorithm attempts introduced above to find a reasonable balance between transferring learning from earlier experiments and trying out new HPCs in the current experimental conditions. In the RNP algorithm, the previously-recommended HPCs are utilized again in the current experimental conditions for a new task, and compared with results obtained from other HPCs in the current experimental conditions, instead of simply re-using the previously-recommended HPCs without additional experimentation. A concrete example of a set of related machine learning tasks for which the RNP algorithm may be beneficial is provided in FIG. 3.

Figure 3:
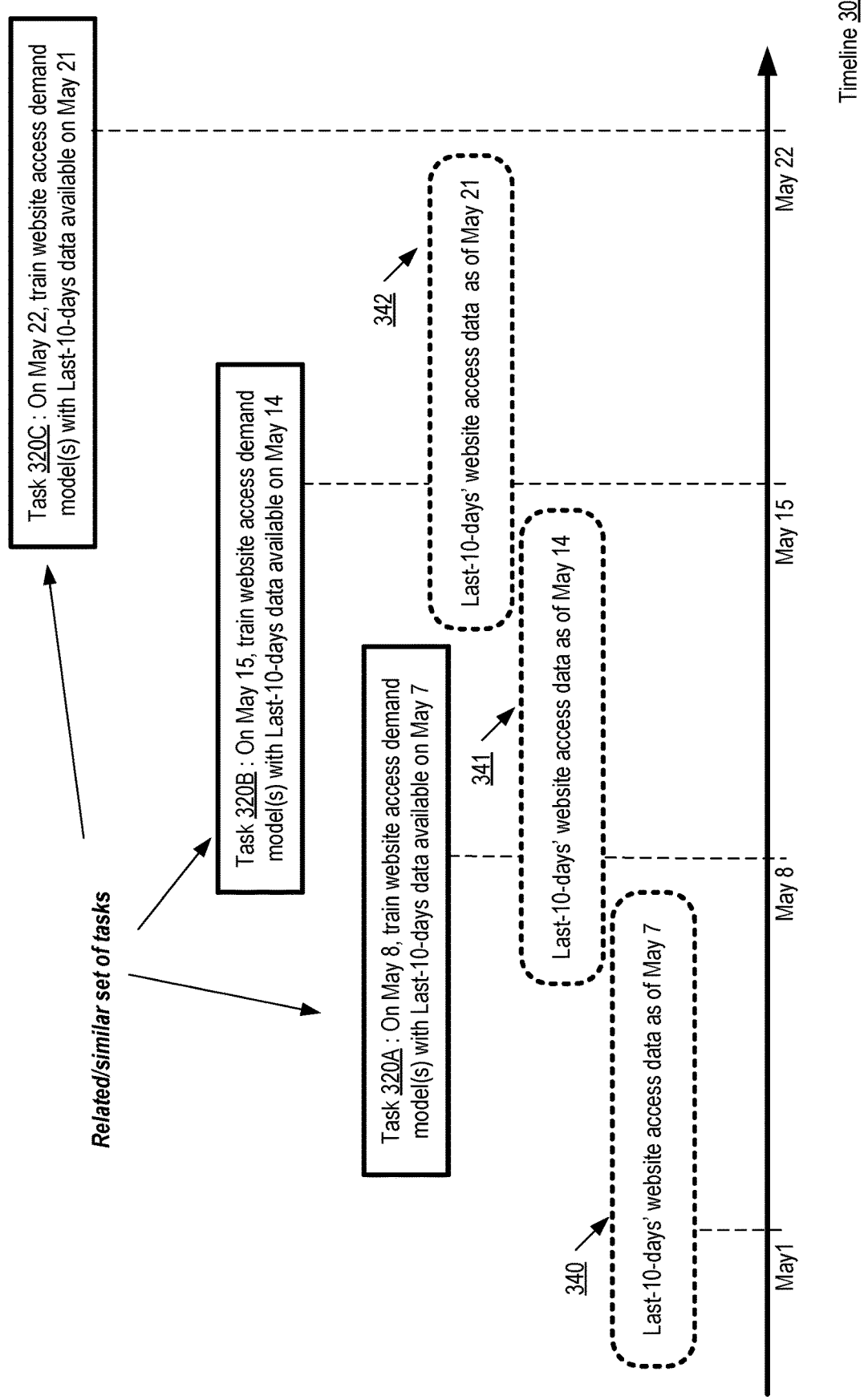
FIG. 3 illustrates an example scenario in which overlapping data sets may be used for training successive versions of a demand prediction model, for each of which hyper-parameter combinations may have to be selected, according to at least some embodiments.

FIG. 3 illustrates an example scenario in which overlapping data sets may be used for training successive versions of a demand prediction model, for each of which hyper-parameter combinations may have to be selected, according to at least some embodiments. In the example scenario depicted in FIG. 3, three similar/related tasks have to be performed on May 8, May 15 and May 22 respectively of a particular year of which a portion is represented by timeline 304. Each of the tasks involve training demand prediction models for accesses to a web site using a recently-collected set of data indicative of accesses directed to the web site by end users.

On May 8, for task 320A, the website access demand models are to be trained using the data collected from the immediately previous 10 days (Last-10-days), e.g., the data 340 available on May 7 for the time period April 28-May 7. On May 15, for task 320B, the website access demand models are to be trained using the data 341 collected from the immediately previous 10 days available on May 14. On May 22, for task 320C, the website access demand models are to be trained using the data 342 collected from the immediately previous 10 days available on May 21. Note that the three sets of input data for training the models overlap slightly. Newer sets of input data may be used for each of the training tasks as they may provide a more relevant view of end user behavior than older data in the example scenario. In FIG. 3, the tasks 320A, 320B and 320C are related not only in that they are attempts to solve a very similar problem (demand prediction for accesses to a web site), but also in that their respective input data sets overlap at least partially. In such scenarios, it may be even more beneficial to try to use some of the information gathered in earlier tasks' HPC analysis to select HPCs for the newer tasks.

Example Iterations of HPC Analysis

Figure 4:
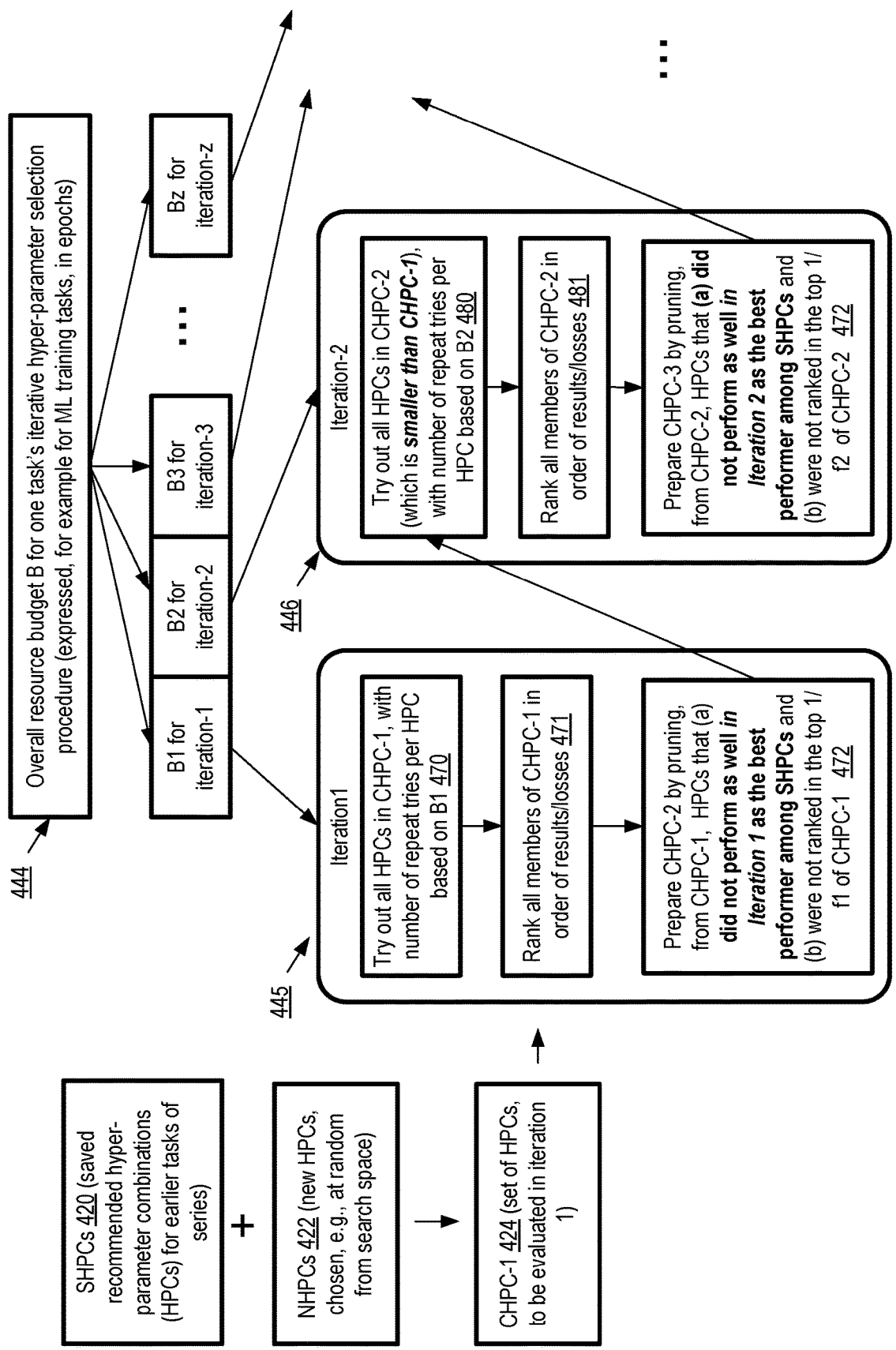
FIG. 4 illustrates aspects of an example budget-constrained iterative approach to hyper-parameter combination selection, according to at least some embodiments.

FIG. 4 illustrates aspects of an example budget-constrained iterative approach to hyper-parameter combination selection, according to at least some embodiments. In the embodiment shown in FIG. 4, an overall resource budget B indicated in element 444 may be determined or identified for one task's iterative hyper-parameter selection procedure, in which information from hyper-parameter selection efforts of earlier tasks of a series of related tasks may be utilized in accordance with the RNP algorithm introduced above. In some scenarios in which the tasks involve training one or more machine learning models, the budget B may be expressed simply in the number of allowed passes or epochs through a training data set. In other embodiments, units such as CPU-seconds or GPU seconds may be used for the budget. In at least some embodiments, the budget B may be indicated by a client of an analytics service at which the hyper-parameters are selected at the request of the client. The budget B may be subdivided into per-iteration budgets such as B1 for iteration 1 of the HPC analysis, B2 for iteration 2, B3 for iteration 3, and so on, up to Bz for the final iteration.

The set of candidate HPCs to be evaluated for the first of the HPC analysis iterations (Iteration 1), denoted as CHPC-1 424, for the task may be determined by combining two kinds of HPCs in the depicted embodiment: SHPCs 420 and NHPCs 422. The SHPCs may comprise some number of saved recommended HPCs from earlier tasks of the series (in the case of the very first task of the series, the set of SHPCs may be initialized to an empty set, as in line 2 of the example pseudo-code shown earlier, because no earlier-recommended HPCs exist for the series). The NHPCs 422 may comprise some number of new HPCs (new in the sense that they are not among the SHPCs, and have not yet been evaluated for the current task) identified from the hyper-parameter search space of the task. The number of members of NHPCs 422 may be determined based at least in part on the budget B—e.g., if a greater budget Bq is available for a task Tq than the budget Bp was available for task Tp, more new HPCs may be selected as members of NHPCs for Bq than were selected as members of NHPCs for Bp. In some embodiments, the members of NHPCs may be selected using a random selection or uniform sampling from the search space; in other embodiments, more deterministic approaches may be used.

In iteration 1, at least the following operations of element 445 may be performed in the depicted embodiment. As shown in element 470, all the HPCs in CHPC-1 may be tried out (i.e., the task may be run with each of the HPCs), with the specific number of repeat tries per HPC being determined by B1. This corresponds to the logic of line 9 of the example pseudo-code for k=1. In some embodiments, if sufficient computing devices are available, at least some of the HPCs may be tried out in parallel—that is, the different HPCs of CHPC-1 may not necessarily be tried out in sequence.

After the members of CHPC-1 are tried out, as indicated in element 471, all the members of CHPC-1 may be ranked relative to each other based on their relative performance in the depicted embodiment. This corresponds to the logic of line 10 of the example pseudo-code. Any of a variety of result quality metrics (such as loss functions in the case of machine learning training tasks) may be used to rank the members of CHPC-1.

The set of candidate HPCs CHPC-2 to be analyzed in iteration 2 may be determined in operations corresponding to element 472 of FIG. 4, and lines 11 and 12 of the example pseudo-code. From CHPC-1, some HPCs may be designated as suitable for the next iteration, and included in CHPC-2; the remaining may in effect be classified as unsuitable for iterations, and eliminated from CHPC-1 to derive CHPC-2. A given HPC may be pruned or eliminated in the depicted embodiment if (a) the given HPC did not perform as well in iteration 1 as the best performer among the SHPCs that were tried out in Iteration 1 and (b) if the given HPC was not ranked in the top 1/f1 fraction of HPCs. The fraction f1 may be a function of a default pruning parameter in at least some embodiments. For example, in line 12 of the pseudo-code, in order to avoid elimination, a given HPC has to perform as well as the SHPCs and also be ranked in the top $\lfloor n/\eta \rfloor$ for k=1, where n is the default pruning parameter.

The members of CHPC-2 may be tried out in iteration 2 (element 446), using the iteration-specific budget split B2 in the depicted embodiment. Note that because of the elimination/pruning of candidates, the cardinality of CHPC-2 is smaller than that of CHPC-1. This means that if the budget splits B1, B2, . . . , are of equal size, the number of trials of a given HPC that manages to survive the pruning may typically increase from one iteration to the next. For at least some types of tasks, increasing the number of trials using any given HPC may generally lead to better task results—for example, for machine learning model training, as the number of epochs through the training data set is increased, the probability of converging to the optimal values for learned parameters of the model may typically increase. Note that in some embodiments, the overall budget B may not necessarily be split equally among the iterations—e.g., splits B1, B2, B3 etc. may differ in size from one another. In one embodiment, a client may specify the budget-splitting algorithm to be used—e.g., whether the budget B is to be split evenly across iterations, or if not, the formulas to be used to split B non-uniformly across the iterations.

As shown in element 480, the members of CHPC-2 may be tried out, with the number of repeat tries per HPC based on the budget split B2. Then, all the members of CHPC-2 may be ranked relative to one another (element 481). Next, CHPC-3, the set of HPCs to be tried out in iteration 3 (which is not shown in FIG. 4) may be derived from CHPC-2, using logic similar to that used to generate CHPC-2 from CHPC-1. HPCs of CHPC-2 that did not rank as highly as the best performer among the SHPCs may be eliminated, and HPCs that were not ranked in the top 1/f2 of CHPC-2 may also be eliminated in the depicted embodiment. Succeeding iterations, such as iteration 3, iteration 4, etc. may follow the same pattern as shown for iterations 1 and 2 shown in FIG. 4, with candidate HPCs being pruned in each case and a respective fraction of the budget being used for each iteration. A record of the best performing HPCs in each iteration may be maintained in various embodiments. After all the iterations are complete, the best-performing HPC from all the iterations may be selected as the recommended HPC for the task, and added to the SHPCs considered for future tasks of the series.

Figure 5:
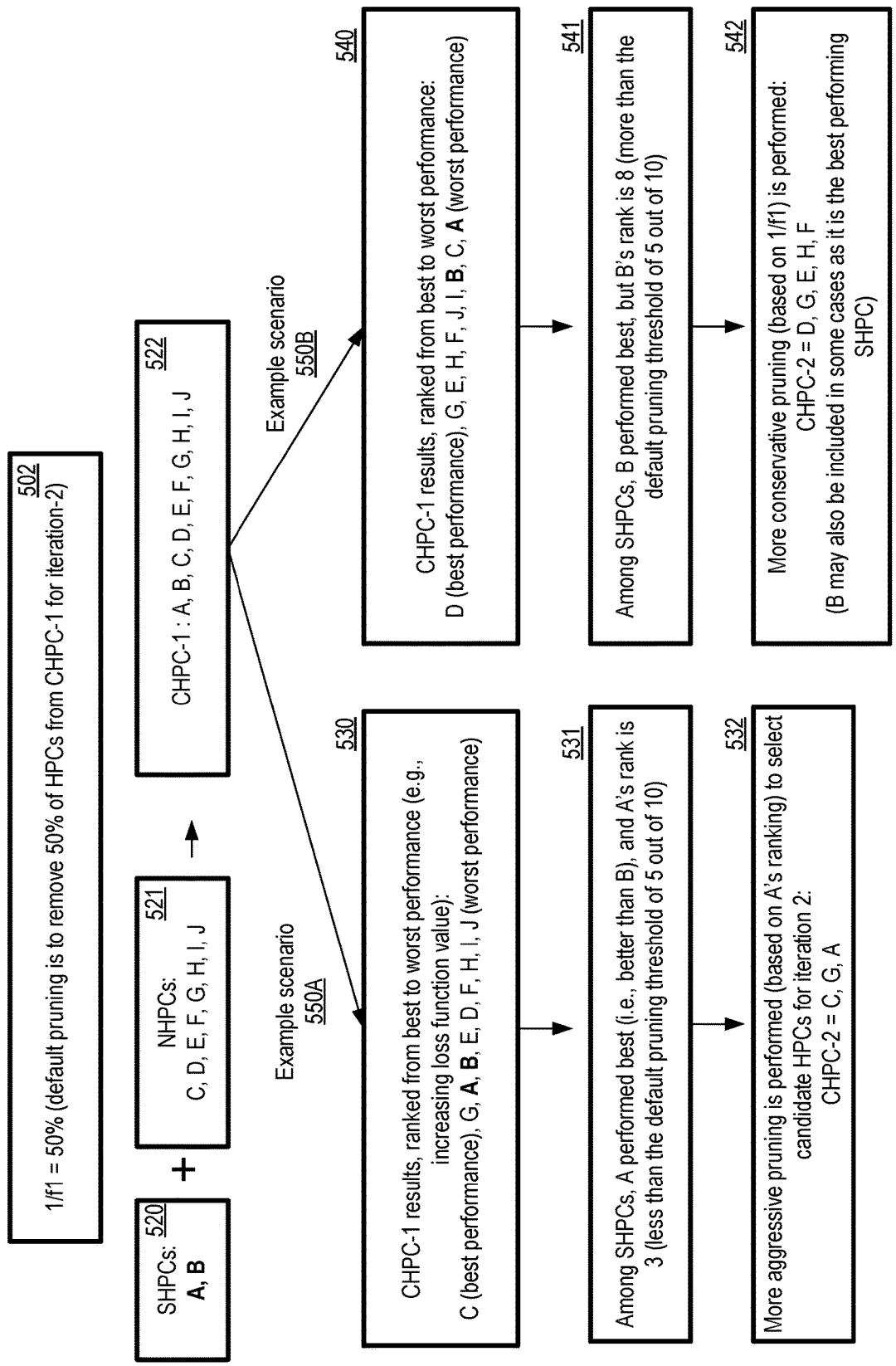
FIG. 5 illustrates examples of alternative pruning scenarios for selecting candidate hyper-parameter combinations, according to at least some embodiments.

To more clearly illustrate the two-pronged ranking-based pruning approach of the RNP algorithm, it may be beneficial to consider a very simple concrete example. FIG. 5 illustrates examples of alternative pruning scenarios for selecting candidate hyper-parameter combinations, according to at least some embodiments. As shown in element 502, 50% of the HPCs are to be pruned by default when transitioning from one HPC analysis iteration to the next—in the terminology used in FIG. 4, 1/f1 is 50%.

As shown in element 522, a set of candidate HPCs to be evaluated in iteration 1 of the RNP algorithm is created by combining previously-recommended HPCs labeled A and B (shown as members of SHPCs set 520) and new HPCs 521 (HPCs labeled C, D, E, F, G, H, I, J). In total 10 HPCs are included in CHPC-1. The task being considered is executed using each of the 10 members of CHPC-1 (assume for simplicity that each HOC is tried out exactly once), and the results of the executions are compared and ranked relative to one another.

Two examples of rankings that might be encountered in the scenario of FIG. 5 are shown. In example scenario 550A, as shown in element 530, the ranked list of HPCs (in order of best-to-worst performance, such as from the lowest to the highest loss function value) is: C (best performance), G, A, B, E, D, F, H, I, J (worst performance). As shown in element 531, among the SHPCs A and B, A performed best (i.e., better than B), and A's rank is 3, which is a lower number than 5, the default threshold for pruning based on 1/f1. That is, if only the default pruning parameter were used to eliminate HPCs, 5 out of the 10 members would be pruned. However, because pruning takes the ranking of the best performing SHPC into account, only 3 best performing members of CHPC-1 would be retained for CHPC-2 (the set of HPCs tried out in iteration 2) in the example scenario 550A. As such, more aggressive pruning is performed as shown in element 532, based on the ranking of the SHPC A (which happens to perform better than the other SHPCs tried), and CHPC-2 is set to the set of three HPCs C, G and A.

In contrast, in example scenario 550A, as shown in element 540, the ranked list of HPCs (in order of best-to-worst performance, such as from the lowest to the highest loss function value) is: D (best performance), G, E, H, F, J, I, B, C, A (worst performance). Among the SHPC members A and B, B has the best rank (8), but B's rank is higher (worse) than the default pruning threshold of 5 out of 10, as indicated in element 541. In this type of scenario, more conservative pruning is performed, based on the default pruning parameter, as indicated in element 542. In some implementations, exactly 50% of the members of CHPC-1 may be retained for CHPC-2, so CHPC-2 may include D, G, E, H, and F. In other implementations, the best-performing SHPC member may also be included, so the CHPC-2 may also include B. Thus, the default pruning parameter may serve as the deciding factor for pruning in scenarios in which the SHPCs do not perform well relative to the new HPCs (as may be expected to happen if the tasks of the series are not really very similar, even though their hyper-parameter search spaces may overlap), and the SHPCs may serve as the deciding factor in scenarios in which the SHPCs do perform well.

In some embodiments, instead of taking just the single-best performer among the previously-recommended HCPs into account for pruning, the top p performers (where p is itself a configuration setting which may be provided by a client) may be used. For example, if p is set to 2, the pruning threshold may be set to the ranking of the second-best performer among the SHPCs, instead of the best performer. Similarly, the minimum number of previously-recommended HPCs that are retained as candidates from one iteration to the next may also be set to a number other than 1 in some implementations. IF at least two of the SHPCs have to be retained for all the iterations, both A and B may be included in CHPC-2 in example scenario 550A as well as in example scenario 550B.

Methods for Resource-Efficient Hyper-Parameter Combination Selection

Figure 6:
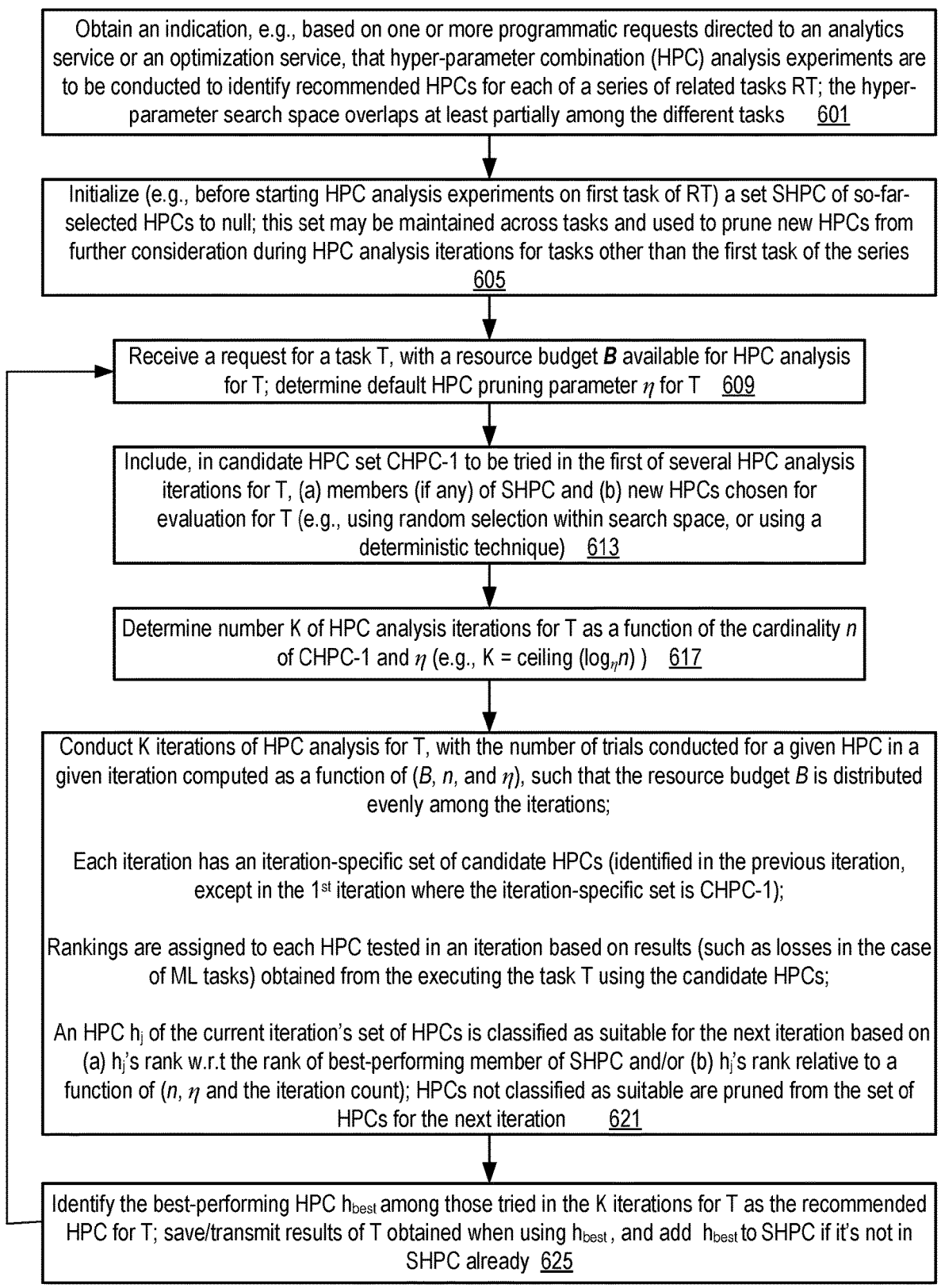
FIG. 6 is a flow diagram illustrating aspects of operations that may be performed to efficiently identify hyper-parameter combinations for tasks with overlapping hyper-parameter search spaces, according to at least some embodiments.

FIG. 6 is a flow diagram illustrating aspects of operations that may be performed to efficiently identify hyper-parameter combinations for tasks with overlapping hyper-parameter search spaces, according to at least some embodiments. As shown in element 601 an indication may be obtained, e.g., based on one or more programmatic requests directed to an analytics service similar in functionality to analytics service 102 of FIG. 1, that hyper-parameter combination (HPC) analysis experiments are to be conducted to identify or select recommended HPCs for each of a series of related tasks RT. The tasks of RT may be related to each other in various ways in different embodiments; the hyper-parameter search spaces of the tasks of the series may overlap at least partly with each other in the depicted embodiment.

According to at least some embodiments, a set SHPC of so-far-selected HPCs (i.e., HPCs that have been recommended for previous tasks of the series) may be initialized to null, e.g., before starting on the HPC analysis operations of the very first task of RT (element 605). This set SHPC may be maintained across the series of tasks, and used to prune new HPCs from further consideration during HPC analysis iterations for tasks other than the initial task of the series in various embodiments. The initialization of SHPC corresponds to line 2 of the RNP algorithm pseudo-code presented earlier.

A request for a task T (e.g., a request to select a recommended HPC for T) may be received in various embodiments (element 609), e.g., via a programmatic interface from a client of an analytics service. A resource budget B as well as a default pruning parameter n may be identified for T, e.g., based on input provided by the client and/or based on heuristics or knowledge base entries accessible at the analytics service.

A candidate HPC set CHPC-1 comprising HPCs to be tried out in the first of several iterations of HPC analysis for T may be identified in the depicted embodiment (element 613). The members of CHPC-1 may include the members of SHPC, as well as some number of new HPCs selected from the search space of hyper-parameters of T. The operations of element 613 correspond to lines 5 and 6 of the example pseudo-code presented above. The new HPCs may be selected from the search space using a variety of techniques in different embodiments, such as uniform sampling, non-uniform sampling, or based on similarity metrics with respect to the members of SHPC. In some embodiments, a client on whose behalf the HPC analysis is being performed may provide an indication of an algorithm to be used to select the new HPCs from the search space. The number of new HPCs selected may vary with the budget B in some embodiments—e.g., more new HPCs may be selected for analysis if a larger resource budget is available for the analysis. In at least some embodiments, the number of HPC analysis iterations to be conducted may be computed as a function of the cardinality n of CHPC-1 and η: e.g., K may be set to the ceiling of ($\log_n$ n) (element 617).

K iterations of HPC analysis may be conducted for the task T in the depicted embodiment (element 621), corresponding to the for loop shown in lines 8-13 of the example pseudo-code. The number of trials conducted for a given HPC in a given iteration may be computed as a function of (B, n and η) (e.g., as in line 9 of the pseudo-code). In at least some embodiments, this function may be chosen so as to evenly divide the resource budget B among the iterations. In other embodiments, other types of functions which do not divide B equally across iterations may be used. Each iteration may have an associated iteration-specific set of candidate HPCs in the depicted embodiment, whose members are identified in the previous iteration (except of course for iteration 1, where the iteration-specific set is CHPC-1 itself).

Rankings may be assigned in various embodiments to each of the HPCs tested in a given iteration, based on results (such as loss function values in the cases where the tasks comprise training of machine learning models) obtained from executing T using each of the candidate HPCs. To derive the next iteration's candidate HPCs, the rankings of the current iteration's HPCs may be employed in the following manner in at least some embodiments. A given HPC $h_j$ of the current iteration may be classified as suitable or selected for the next iteration in such embodiments based on (a) the rank of $h_j$ relative to the rank of the best-performing member of SHPC and/or (b) the rank of $h_j$ relative to a function of n, η and the iteration count, indicating a default ranking boundary (this corresponds to line 12 of the pseudocode,). HPCs Those HPCs which do not meet these criteria may in effect be classified as unsuitable for the next iteration, and pruned or eliminated from the candidate HPCs of the current iteration to obtain the candidate HPCs of the next iteration. As such, ranking boundaries for pruning or rejecting HPCs may be determined based on both the performance of the SHPCs and on the default pruning parameter in at least some embodiments.

As indicated in element 625, the best-performing HPC $h_{best}$ among those tried across all the iterations may be selected as the recommended HPC for T in the depicted embodiment. The results of executing T using $h_{best}$ may be saved and/or transmitted to one or more destinations, and $h_{best}$ may be added to SHPC if it is not already in SHPC in various embodiments (element 625). The operations of element 625 of FIG. 6 correspond to lines 14-17 of the example pseudo-code presented earlier. Operations corresponding to elements 609 onwards may be repeated as and when requests for selecting HPCs for additional tasks are received in various embodiments.

In at least some embodiments, a client may submit a request to stop automated HPC analysis for the series of tasks similar to T (e.g., if the series of tasks ends, or if the client's resource budget for additional HPC analysis runs out), in which case the analysis of additional tasks may not have to be conducted. It is noted that in various embodiments, some of the operations shown in FIG. 6 may be implemented in a different order than that shown in the figure, or may be performed in parallel rather than sequentially. Additionally, some of the operations shown in FIG. 6 may not be required in one or more implementations.

Example Programmatic Interactions

Figure 7:
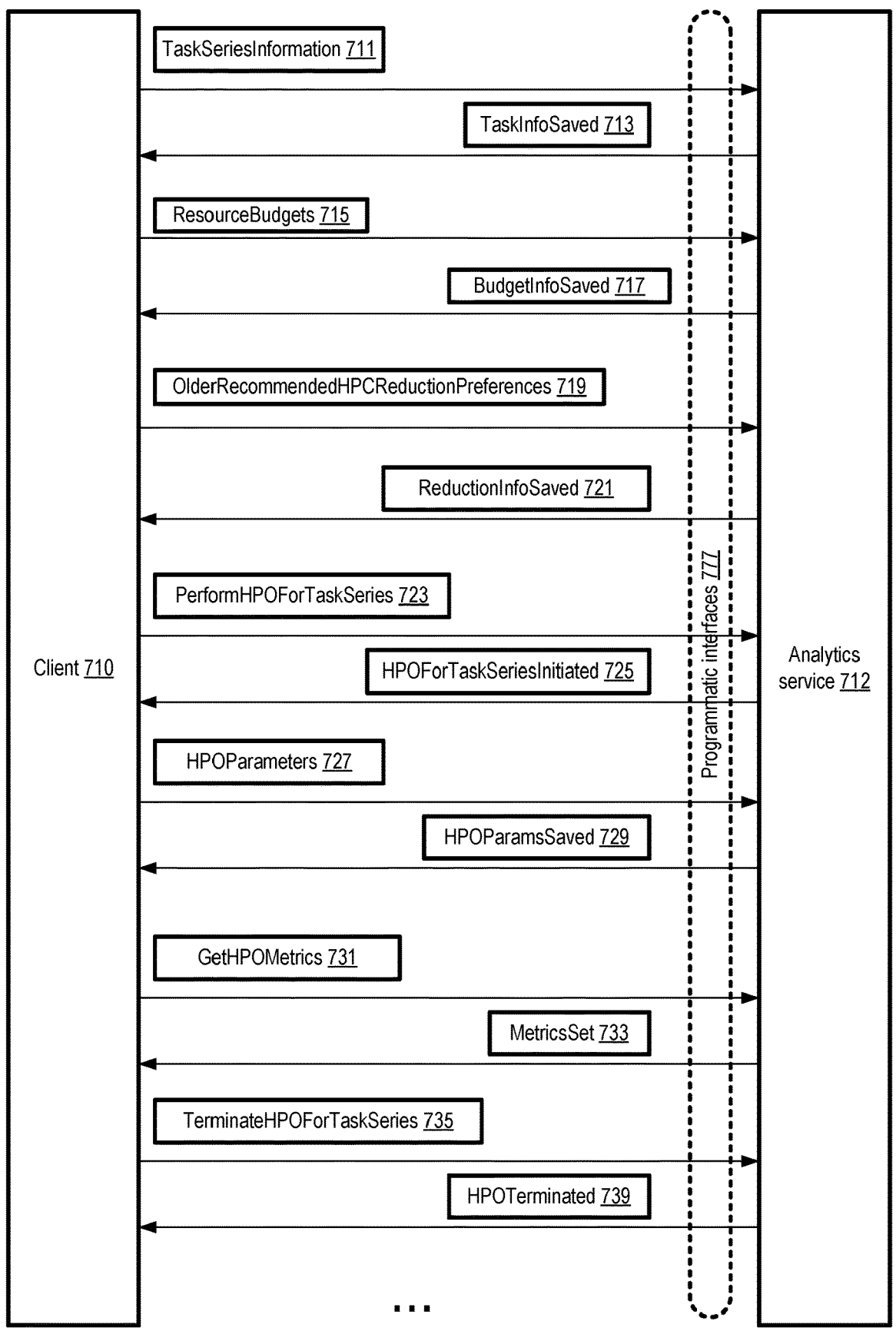
FIG. 7 illustrates example programmatic interactions between clients and an analytics service, according to at least some embodiments.

FIG. 7 illustrates example programmatic interactions between clients and an analytics service, according to at least some embodiments. An analytics service 712, similar in features and functionality to analytics service 102 of FIG. 1, may implement a set of programmatic interfaces 777 in the depicted embodiment, such as web-based consoles, command-line tools, graphical user interfaces, APIs and the like. Clients 710 of the analytics service 712 may use the programmatic interfaces 777 to submit various types of messages and requests pertaining to hyper-parameter optimization, and receive corresponding responses from the analytics service.

In various embodiments, a client may submit one or more TaskSeriesInformation messages 711 that provide information about the series of related tasks for which HPCs are to be selected using an algorithm such as the RNP algorithm introduced above. The information provided may, for example, include instructions on how to execute the tasks (source code or executable versions of the tasks may be provided), when to expect new tasks (e.g., whether new similar tasks are scheduled every day, every week, etc.), information about how the input data sets for the tasks of the series are to be obtained, the kinds of hyper-parameters to be evaluated and the overall search space of the hyper-parameters, task execution requirements (e.g., whether the tasks can be run on general purpose computing devices or whether devices equipped with a specified number or type of GPUs is needed, etc.) and the like. The information provided about the task series may be saved at a repository by the analytics service, and a TaskInfoSaved message 713 may be sent to the client in at least some embodiments.

A client may provide information about the resource budgets available for HPC analysis, either for each task separately or a common budget for several tasks of a series, using ResourceBudgets messages 715 in some embodiments. For tasks that involve training machine learning models, e.g., including deep learning models with complex neural network architectures, the resource budgets may sometimes be expressed in terms of epochs or passes through the training data sets. Units such as CPU-seconds or GPU-seconds may be used to express CPU budgets for some types of tasks. The budget information may be stored at a repository, and a BudgetInfoSaved message 717 may be sent to the client in some embodiments.

As more recommended HPCs (the members of SHPC sets discussed earlier) are identified and accumulated for the tasks of a long series of tasks, at some point it may no longer be efficient or useful to keep using all the previously-recommended HPCs for pruning HPC candidates in the RNP algorithm. In some embodiments, a client may specify criteria or algorithms to be used for eliminating some of the saved recommended HPCs, e.g., in the form of an Older-RecommenedHPCReductionPreferences message 719 in the depicted embodiment. Any of a variety of techniques may be used to ensure that the total number of previously-recommended HPCs to be utilized for a given task's HPC pruning remains below a limit in different embodiments. In some embodiments, a random selection algorithm may be used to select no more than J such previously-recommended HPCs. In other embodiments, a FIFO queue with a maximum size J may be maintained, with new recommended HPCs being inserted into the FIFO queue as new tasks are analyzed, and older recommended HPCs being dropped from the queue after it fills up. Only the J most recently identified recommended HPCs may be utilized as members of the SHPC sets in such embodiments. In one embodiment, a clustering algorithm may be applied to group recommended HPCs based on similarity, and only one HPC (or a small number of HPCs) from a given cluster of similar recommended HPCs may be selected as a member of the SHPC set. The analytics service 712 may save the preferences regarding reducing previously-recommended HPCs, and send a ReductionInfoSaved message 721 to the client in at least some embodiments.

A client may submit a PerformHPOForTaskSeries request 723 to initiate the selection of HPCs for a specified set of related tasks in the depicted embodiment. The analytics service may start implementation of the RNP algorithm for the specified series of tasks, and inform the client via an HPOForTaskSeriesInitiated message 725 that the execution of the algorithm has begun. In some embodiments, a client may submit a separate request to run the algorithm for each task of the series, instead of using a single request to initiate HPC analysis for the whole series.

In various embodiments, a client may a specific set of parameters (such as the default pruning parameter, a budget distribution parameter indicating how the budget for a particular task is to be distributed among iterations of HPC analysis, a parameter indicating how many of the top-performing SHPC members are to be used for pruning candidate HPCs, a parameter indicating an algorithm to be employed to select the set of new HPCs to be evaluated for a given task along with the previously-recommended HPCs, etc.) to be used for HPC analysis of at least one task of a series of related tasks. For example, the client may indicate an algorithm for selecting new HPCs non-uniformly from the hyper-parameter search space of a task, such that for a particular hyper-parameter H1, most or all of the new HPCs include values within a particular sub-range of H1 instead of being distributed uniformly over the whole range of H1. Such an algorithm may be specified as an HPO parameter in a scenario in which the client has determined, e.g., based on experience with other tasks, that the selected sub-range of H1 is likely to include the optimal value for H1 for the current task. The client may use one or more HPOParameters messages 727 to submit such parameters in the depicted embodiment. An HPOParamsSaved message 729 may be sent to the client after the parameters are saved, and the analytics service may use the specified parameters for the set of tasks indicated in the request.

According to at least one embodiment, metrics associated with the HPC analysis performed at the analytics service may be collected for various tasks, e.g., by HPO coordinators of the kind discussed in the context of FIG. 1. Such metrics may, for example, include an indication of the fraction of the resource budget that was actually utilized for selecting a recommended HPC for a given task (which can indicate the resource savings accrued as a result of the aggressive pruning of the RNP algorithm), the total amount of time taken to identify a recommended HPC for a task, the number of parallel trials of HPCs that were conducted, the results obtained from the tasks when using recommended HPCs, (e.g., precision, recall etc. in the case of machine learning related tasks), and so on. A client may submit a GetHPOMetrics request 731 to obtain such metrics for the client's tasks, and one or more MetricsSet messages 733 containing the metrics may be provided to the client in the depicted embodiment. In at least one embodiment, a MetricsSet message may indicate the portion or fraction of a resource budget allocated to the HPC analysis which was not actually consumed during the HPC analysis, and may thus provide evidence of the resource efficiency of the RNP algorithm.

If and when a client decides that further HPC analysis is not required for the client's series of related tasks, a TerminateHPOForTaskSeries message 735 may be submitted in some embodiments. In response, the analytics service may stop implemented the RNP algorithm on behalf of the client, and send an HPOTerminated message 739 acknowledging the termination of the algorithm in the depicted embodiment. In some embodiments, programmatic interactions associated with HPC analysis, other than those shown in FIG. 7, may be supported by an analytics service 712.

Example Provider Network Environment

Figure 8:
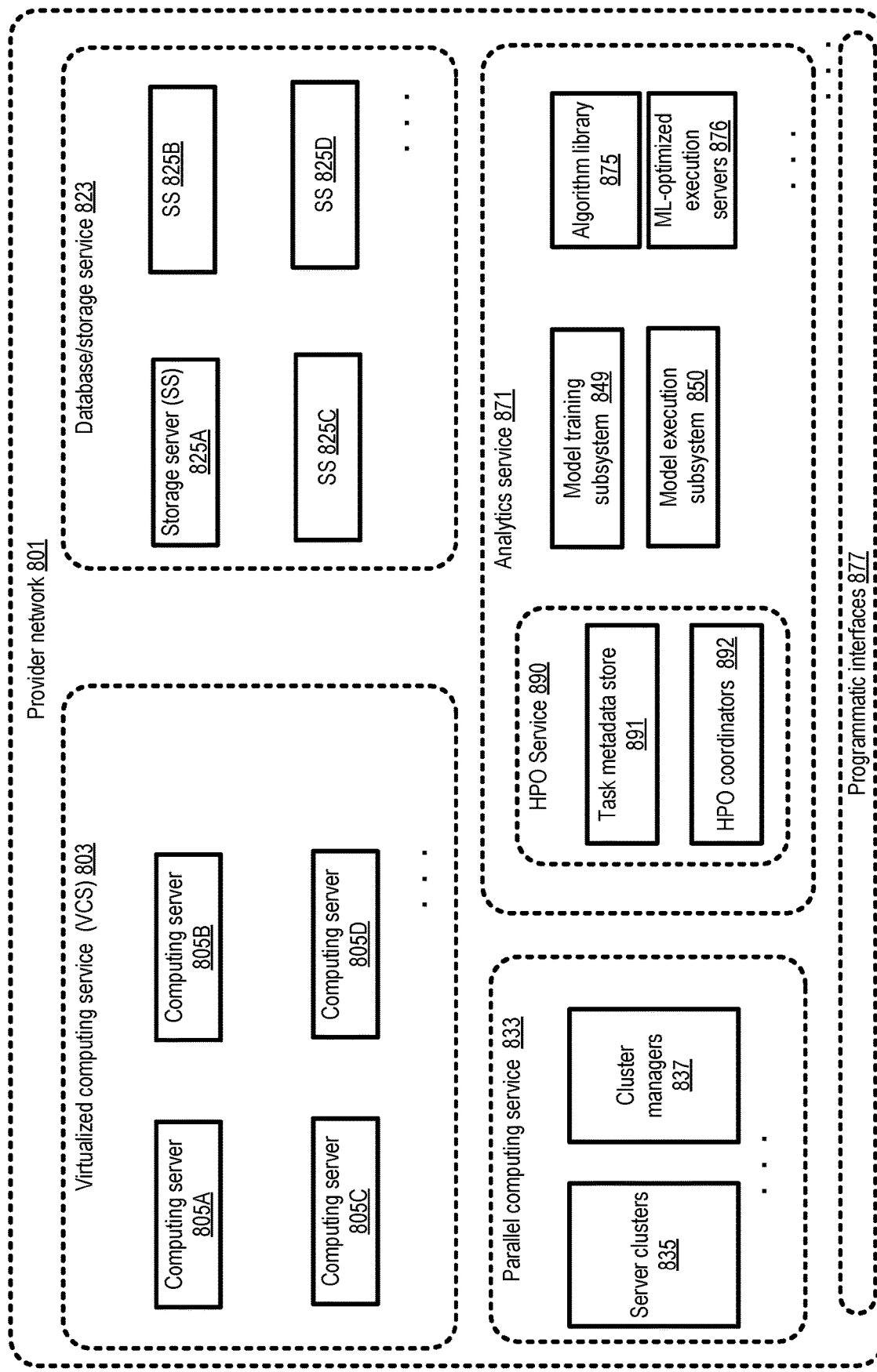
FIG. 8 illustrates an example provider network environment, according to at least some embodiments.

FIG. 8 illustrates an example provider network environment, according to at least some embodiments. In the depicted embodiment, provider network 801 may comprise resources used to implement a plurality of services, including for example a virtualized computing service (VCS) 803, a database/storage service 823, a parallel computing service 833 as well as an analytics service 871 within which a hyper-parameter optimization (HPO) service 890 at which algorithms similar to the RNP algorithm mentioned above may be implemented.

The analytics service 871, which may also be referred to as a machine learning service or an artificial intelligence service, may comprise algorithm library 875, model training subsystem 849 at which various types of models (including models trained using HPCs identified using the RNP algorithm) may be trained and re-trained using algorithms from library 875, model execution subsystem 850 at which the models are executed, as well as a set of machine learning-optimized execution servers 876 (e.g., servers comprising chipsets developed specifically for ML tasks) in the depicted embodiment. The HPO service 890 may include task metadata store 891 at which the kinds of related task descriptors (RTDs) discussed in the content of FIG. 1 may be stored, and a set of HPO coordinators 892 (similar in functionality to the HPO coordinators shown in FIG. 1) in various embodiments. The parallel computing service 833 may include server clusters 835 at which applications of various kinds (including for example parallel execution of tasks using different HPCs as part of the execution of the RNP algorithm) may be executed concurrently by cluster managers 837 in some embodiments.

Components of a given service may utilize components of other services in the depicted embodiment—e.g., for some analytics service tasks, including HPC analysis experiments, virtual machines implemented at computing servers such as 805A-805D of the virtualized computing service 803 may be used, data sets and results of HPC analysis experiments may be stored at storage servers 825 (e.g., 825A-825D) of storage service 823, and so on. Individual ones of the services shown in FIG. 8 may implement a respective set of programmatic interfaces 877 which can be used by external and/or internal clients (where the internal clients may comprise components of other services) in the depicted embodiment. The provider network may include numerous other services in some embodiments, such as software container management services, application development and deployment management services, and so on.

Illustrative Computer System

Figure 9:
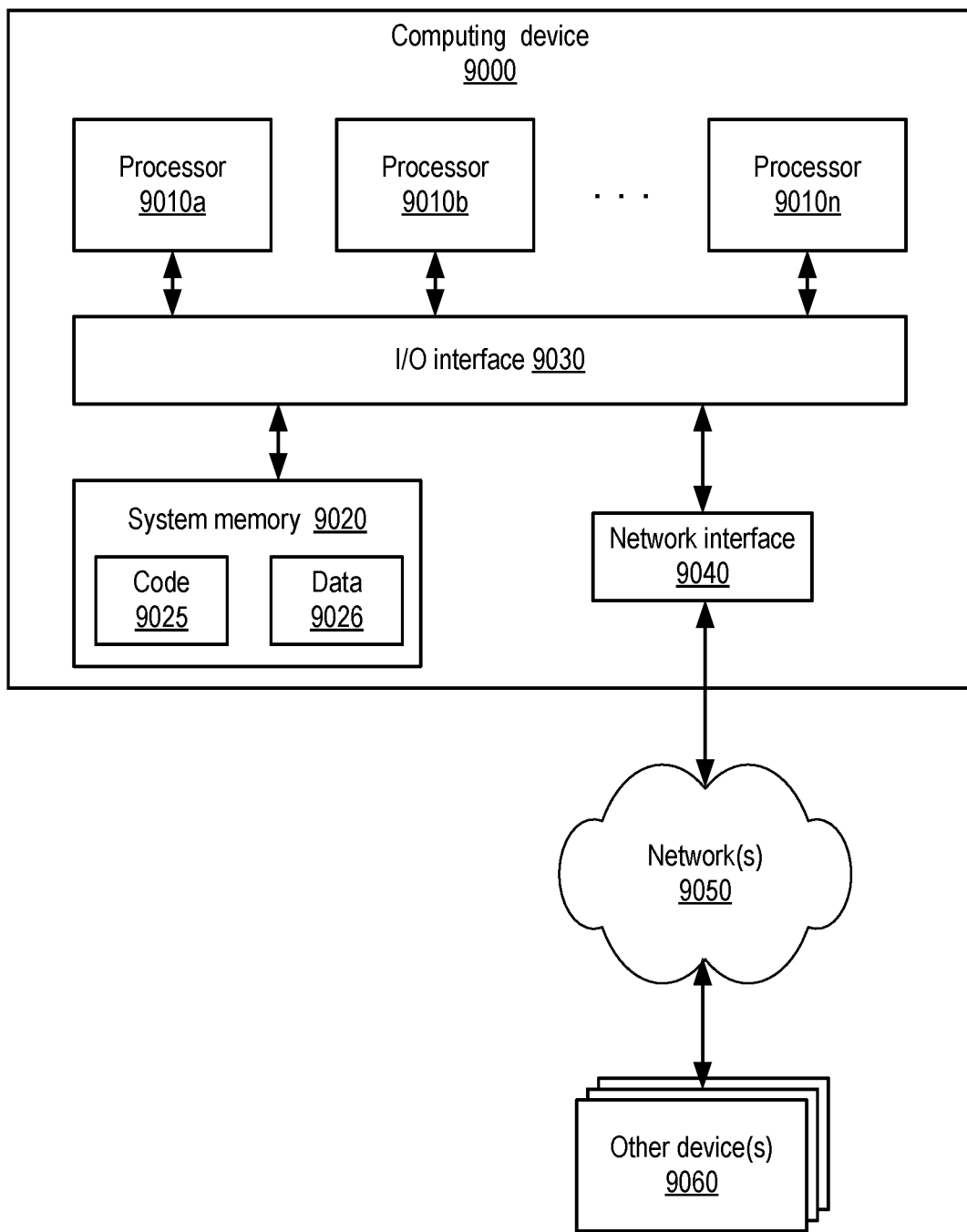
FIG. 9 is a block diagram illustrating an example computing device that may be used in at least some embodiments.

In at least some embodiments, a server that implements the types of techniques described herein (e.g., various functions of an analytics service, including execution of the RNP algorithm for series of related tasks), may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 8. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices cause the one or more computing devices to:
obtain an indication that respective sets of hyper-parameter combination (HPC) analysis experiments are to be conducted for a plurality of related machine learning tasks, wherein hyper-parameter search spaces of individual ones of the related machine learning tasks overlap at least partly with each other;
select, using a first set of HPC analysis experiments, a first recommended HPC for a first machine learning task of the plurality of related machine learning tasks;

include the first recommended HPC in a collection of candidate HPCs to be analyzed for a second machine learning task of the plurality of related machine learning tasks;
conduct, using the collection of candidate HPCs, a second set of HPC analysis experiments for the second machine learning task, wherein the second set comprises a plurality of analysis iterations, and wherein a particular analysis iteration of the plurality of analysis iterations comprises:
performing the second machine learning task using a first iteration-specific set of HPCs, wherein the first iteration-specific set includes (a) the first recommended HPC and (b) one or more other members of the collection;
assigning respective rankings to individual members of the first iteration-specific set of HPCs based at least in part on respective loss function values obtained as a result of the performing;
classifying one or more HPCs from the first iteration-specific set as suitable-for-future-iterations, based at least in part on a comparison of (a) respective rankings assigned to the one or more HPCs and (b) a ranking assigned to the first recommended HPC; and
generating, from the first iteration-specific set, a second iteration-specific set of HPCs for a subsequent analysis iteration of the plurality of analysis iterations, wherein said generating includes pruning, from the first iteration-specific set, one or more hyper-parameter combinations which are not classified as suitable-for-future-iterations; and
select a second recommended HPC for the second machine learning task based at least in part on loss function values computed in the plurality of analysis iterations; and
store an indication of (a) the second recommended HPC and (b) a result of execution of the second machine learning task using the second recommended HPC.

2. The system as recited in claim 1, wherein the particular analysis iteration of the plurality of analysis iterations further comprises:
classifying the one or more HPCs from the first iteration-specific set as suitable-for-future-iterations, based at least in part on a default pruning strategy which is independent of the ranking assigned to the first recommended HPC.

3. The system as recited in claim 1, wherein the one or more computing devices include further instructions that upon execution on or across the one or more computing devices further cause the one or more computing devices to:
utilize, to classify one or more HPCs as suitable-for-future-iterations during a third set of HPC analysis experiments for a third machine learning task, (a) a first ranking assigned to the first recommended HPC in an iteration of the third set of HPC analysis experiments and (b) a second ranking assigned to the second recommended HPC in the iteration of the third set of hyper-parameter combination analysis experiments.

4. The system as recited in claim 1, wherein the one or more computing devices include further instructions that upon execution on or across the one or more computing devices further cause the one or more computing devices to:
obtain, via one or more programmatic interfaces, a resource budget associated with the second machine learning task, wherein the resource budget is expressed in epochs; and
determining, based at least in part on the resource budget, a number of analysis iterations to be conducted for the second machine learning task.

5. The system as recited in claim 1, wherein the one or more computing devices include further instructions that upon execution on or across the one or more computing devices further cause the one or more computing devices to:
obtain, via one or more programmatic interfaces, an indication of an algorithm to be used to select the one or more other members of the collection of candidate HPCs from a hyper-parameter search space of the second machine learning task; and
utilize the algorithm to select the one or more other members of the collection of candidate HPCs.

6. A computer-implemented method, comprising:
including a particular hyper-parameter combination (HPC) in a collection of candidate HPCs to be evaluated for a first task, wherein the particular HPC is a recommended HPC which was identified earlier for a second task;
conducting, using the collection of candidate HPCs, a plurality of hyper-parameter analysis iterations with respect to the first task, wherein a particular hyper-parameter analysis iteration comprises:
executing the first task using a first iteration-specific set of HPCs, wherein the first iteration-specific set includes (a) the particular HPC and (b) one or more other members of the collection;
assigning respective rankings to individual members of the first iteration-specific set of HPCs based at least in part on respective result metrics obtained as a result of said executing;
pruning one or more HPCs from the first iteration-specific set to obtain a second iteration-specific set of HPCs for a subsequent hyper-parameter analysis iteration, wherein a first HPC of the one or more HPCs is selected for pruning based at least in part on a comparison of (a) a ranking assigned to the first HPC and (b) a ranking assigned to the particular HPC; and
identifying a first recommended HPC for the first task based at least in part on analysis of results computed in the plurality of hyper-parameter analysis iterations.

7. The computer-implemented method as recited in claim 6, wherein a first range of values from which a first value of a particular hyper-parameter is selected for inclusion in the particular HPC differs from a second range of values from which a second value of the particular hyper-parameter is selected for inclusion in the first recommended HPC.

8. The computer-implemented method as recited in claim 6, further comprising:
obtaining, via one or more programmatic interfaces, an indication of a resource budget associated with the first task; and
determining, based at least in part on the resource budget, a maximum number of hyper-parameter analysis iterations to be conducted for the first task.

9. The computer-implemented method as recited in claim 6, further comprising:
storing an indication of (a) a plurality of tasks which satisfy a similarity criterion with respect to the first task, wherein the plurality of tasks includes the second task and a third task, and (b) respective recommended HPCs identified for individual ones of the plurality of tasks; and including, in the collection of candidate HPCs evaluated to identify a recommended HPC for the first task, a recommended HPC of the third task.

10. The computer-implemented method as recited in claim 6, further comprising:

eliminating one or more previously-recommended HPCs from a group of previously-recommended HPCs considered for inclusion among the collection of candidate HPCs evaluated for the first task, wherein said eliminating comprises using one or more of: (a) a random subsampling algorithm (b) a fixed-size first-in-first-out (FIFO) queue or (c) a clustering algorithm.

11. The computer-implemented method as recited in claim 6, wherein the first task comprises a task to train one or more machine learning models, and wherein the second task comprises a task to train one or more machine learning models.

12. The computer-implemented method as recited in claim 6, wherein a hyper-parameter of the particular hyper-parameter combination comprises one or more of: (a) a number of layers of a particular type within a neural network, (b) a number of nodes within a particular layer of a neural network, (c) a regularization parameter, (d) an indication of a transformation technique to be applied to an input data set to generate features for training a machine learning model, (e) an indication of an algorithm to be used to select input records for training a machine learning model, (f) a learning rate, or (g) a machine learning algorithm.

13. The computer-implemented method as recited in claim 6, further comprising:

obtaining, via one or more programmatic interfaces of a network-accessible service of a provider network, a request for hyper-parameter optimization; and initiating the plurality of hyper-parameter analysis iterations based at least in part on the request.

14. The computer-implemented method as recited in claim 6, further comprising:

obtaining, via one or more programmatic interfaces of a network-accessible service of a provider network, a request for one or more metrics associated with the a plurality of hyper-parameter analysis iterations with respect to the first task; and providing the one or more metrics in response to the request.

15. The computer-implemented method as recited in claim 14, wherein the one or more metrics indicate that at least a portion of a resource budget allocated to the plurality of hyper-parameter analysis iterations was not consumed during the plurality of hyper-parameter analysis iterations.

16. One or more non-transitory computer-accessible storage media storing program instructions that when executed on or across one or more processors cause the one or more processors to:

include a particular hyper-parameter combination (HPC) in a collection of candidate HPCs to be evaluated for a first task, wherein the particular HPC is a recommended HPC which was identified for a second task;

conduct, using the collection of candidate HPCs, a plurality of hyper-parameter analysis iterations with respect to the first task, wherein a particular hyper-parameter analysis iteration comprises:

executing the first task using a first iteration-specific set of HPCs, wherein the first iteration-specific set includes (a) the particular HPC and (b) one or more other members of the collection;

pruning one or more HPCs from the first iteration-specific set to obtain a second iteration-specific set of HPCs for a subsequent hyper-parameter analysis iteration, wherein a first HPC of the one or more HPCs is selected for pruning based at least in part on a comparison of (a) a result obtained using the first HPC and (b) a result obtained using the particular HPC; and identify a first recommended HPC for the first task based at least in part on analysis of results obtained in the plurality of hyper-parameter analysis iterations.

17. The one or more non-transitory computer-accessible storage media as recited in claim 16, wherein a third hyper-parameter analysis iteration of the plurality of hyper-parameter analysis iterations with respect to the first task comprises:

determining, based at least in part on a default pruning parameter of at least the first task, a ranking boundary for pruning hyper-parameter combinations from a third iteration-specific set of hyper-parameter combinations, wherein the default pruning parameter is independent of results obtained from previously-recommended hyper-parameter combinations; and including a first hyper-parameter combination of the third iteration-specific set in a fourth iteration-specific set of hyper-parameter combinations based at least in part the ranking boundary.

18. The one or more non-transitory computer-accessible storage media as recited in claim 16, storing further program instructions that when executed on or across one or more processors further cause the one or more processors to:

obtain, via one or more programmatic interfaces, an indication of a resource budget associated with the first task; and determine, based at least in part on the resource budget, a number of HPCs to be included in the collection of candidate HPCs.

19. The one or more non-transitory computer-accessible storage media as recited in claim 16, storing further program instructions that when executed on or across one or more processors further cause the one or more processors to:

store an indication of (a) a plurality of tasks which satisfy a similarity criterion with respect to the first task, wherein the plurality of tasks includes the second task and a third task, and (b) respective recommended HPCs identified for individual ones of the plurality of tasks; and include, in the collection of candidate HPCs evaluated to identify a recommended HPC for the first task, a recommended HPC of the third task.

20. The one or more non-transitory computer-accessible storage media as recited in claim 16, wherein an input data set of the first task differs from an input data set of the second task.

\* \* \* \* \*